United States Patent
Hayakawa et al.

(10) Patent No.: US 9,142,131 B2
(45) Date of Patent: Sep. 22, 2015

(54) VEHICLE DRIVING SUPPORT APPARATUS

(75) Inventors: Yasuhisa Hayakawa, Yokohama (JP); Shuhei Nishimaki, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 91 days.

(21) Appl. No.: 14/128,952

(22) PCT Filed: Aug. 6, 2012

(86) PCT No.: PCT/JP2012/004986
§ 371 (c)(1),
(2), (4) Date: Dec. 23, 2013

(87) PCT Pub. No.: WO2013/031095
PCT Pub. Date: Mar. 7, 2013

(65) Prior Publication Data
US 2014/0136015 A1 May 15, 2014

(30) Foreign Application Priority Data
Aug. 31, 2011 (JP) .................................. 2011-189504

(51) Int. Cl.
*G08G 1/01* (2006.01)
*G08G 1/04* (2006.01)
(Continued)

(52) U.S. Cl.
CPC . *G08G 1/166* (2013.01); *B60T 7/22* (2013.01); *B60T 8/17557* (2013.01); *B60T 17/22* (2013.01);
(Continued)

(58) Field of Classification Search
CPC ................... B60R 2300/802; B60R 2300/804; B60R 2300/8066; B60R 2300/8086; B60R 2300/8093; B60W 10/20; B60W 30/08; B60W 30/09; B60W 30/095; B60W 30/10; B60W 30/12; B60W 30/18163; B60W 50/08; B60W 50/10; B60W 50/14; B60W 50/143; B60W 50/146; B60W 40/072; B60W 2510/205; B60W 2540/18; B60W 2550/10; B60W 2550/14; B60W 2550/043; B60W 2550/146; B62D 6/00; B62D 6/002; B62D 1/04; B62D 1/16; B62D 1/166; B62D 1/167; B62D 15/021; B62D 15/025; B62D 15/029; B62D 15/0265; B60T 7/12; B60T 7/22; B60T 17/22; B60T 2201/08; B60T 2201/24; B60T 2201/34; B60T 2201/36; B60T 2201/087; B60T 2207/30252; B60T 2207/30261; G06K 9/00791; G06K 9/00798; G06K 9/00805; G06K 9/00835; G08G 1/04; G08G 1/16; G08G 1/166; G08G 1/167
See application file for complete search history.

(56) References Cited

U.S. PATENT DOCUMENTS 6,725,145 B1 * 4/2004 Takahashi ........................ 701/70
6,973,380 B2 * 12/2005 Tange et al. ..................... 701/70
(Continued)

FOREIGN PATENT DOCUMENTS

EP 2455266 A1 5/2012
JP 5-85221 A 4/1993
(Continued)

OTHER PUBLICATIONS

Machine translation of the written description for the Kagawa JP 2004-351994 patent application. Machine translation completed on May 26, 2015.*

*Primary Examiner* — Fadey Jabr
*Assistant Examiner* — Kevin P Mahne
(74) *Attorney, Agent, or Firm* — Foley & Lardner LLP

(57) ABSTRACT

A braking/driving force control unit determines whether or not the driver has a intention of lane change on the basis of the detected road shape and the steering amount. The braking/driving force control unit detects an obstacle which is an obstacle present rearward and sideward of the vehicle. The braking/driving force control unit determines whether approach prevention control for preventing an the vehicle from approaching to the obstacle should start, when it is determined that the driver has the intention of lane change and the obstacle is detected, and performs the approach prevention control for supporting prevention of the vehicle from approaching to the obstacle when it is determined that the control should start. At this time, the braking/driving force control unit determines detection accuracy of the road shape ahead of the vehicle and suppresses the determination of the start of the control when the detection accuracy is low.

18 Claims, 9 Drawing Sheets

(51) Int. Cl.

| | | |
|---|---|---|
| *G08G 1/16* | (2006.01) | |
| *B60W 50/00* | (2006.01) | |
| *B62D 15/00* | (2006.01) | |
| *B62D 6/00* | (2006.01) | |
| *B60W 30/10* | (2006.01) | |
| *B60W 30/12* | (2006.01) | |
| *B60W 10/20* | (2006.01) | |
| *B60T 7/22* | (2006.01) | |
| *B60T 17/22* | (2006.01) | |
| *B60W 50/14* | (2012.01) | |
| *B62D 15/02* | (2006.01) | |
| *B60T 8/1755* | (2006.01) | |
| *B60W 30/18* | (2012.01) | |

(52) U.S. Cl.
CPC ........... *B60W 50/14* (2013.01); *B62D 15/0265* (2013.01); *G08G 1/167* (2013.01); *B60T 2201/08* (2013.01); *B60T 2210/24* (2013.01); *B60T 2210/34* (2013.01); *B60T 2210/36* (2013.01); *B60W 30/18163* (2013.01); *B60W 2550/14* (2013.01)

(56) References Cited

U.S. PATENT DOCUMENTS

| | | | |
|---|---|---|---|
| 2002/0091479 A1 | 7/2002 | Maruko et al. | |
| 2003/0163238 A1* | 8/2003 | Matsumoto et al. | 701/70 |
| 2003/0195684 A1* | 10/2003 | Martens | 701/41 |
| 2004/0010371 A1* | 1/2004 | Matsumoto et al. | 701/300 |
| 2004/0107035 A1* | 6/2004 | Tange et al. | 701/70 |
| 2004/0186651 A1* | 9/2004 | Tange et al. | 701/96 |
| 2005/0065663 A1* | 3/2005 | Oyama | 701/1 |
| 2006/0155463 A1* | 7/2006 | Adachi | 701/208 |
| 2007/0192006 A1* | 8/2007 | Kimura et al. | 701/45 |
| 2007/0225914 A1* | 9/2007 | Kawazoe et al. | 701/301 |
| 2007/0255474 A1* | 11/2007 | Hayakawa et al. | 701/70 |
| 2008/0021608 A1* | 1/2008 | Schmitz | 701/36 |
| 2008/0021613 A1* | 1/2008 | Hamaguchi et al. | 701/41 |
| 2008/0133092 A1* | 6/2008 | Hozumi et al. | 701/49 |
| 2008/0147249 A1* | 6/2008 | Kuge et al. | 701/1 |
| 2008/0172153 A1* | 7/2008 | Ozaki et al. | 701/36 |
| 2008/0243337 A1* | 10/2008 | Tsuda | 701/41 |
| 2008/0300766 A1* | 12/2008 | Kumabe et al. | 701/98 |
| 2009/0132125 A1* | 5/2009 | Yonezawa et al. | 701/41 |
| 2009/0319113 A1* | 12/2009 | Lee | 701/25 |
| 2010/0023218 A1* | 1/2010 | Hayakawa et al. | 701/42 |
| 2010/0030430 A1* | 2/2010 | Hayakawa et al. | 701/42 |
| 2010/0082203 A1* | 4/2010 | Isaji et al. | 701/41 |
| 2010/0211235 A1* | 8/2010 | Taguchi et al. | 701/1 |
| 2010/0250064 A1* | 9/2010 | Ota et al. | 701/36 |
| 2010/0324823 A1 | 12/2010 | Kobayashi et al. | |
| 2011/0238254 A1* | 9/2011 | Mulder et al. | 701/29 |
| 2011/0251749 A1* | 10/2011 | Schwarz et al. | 701/29 |
| 2013/0030602 A1* | 1/2013 | Joeng | 701/1 |
| 2013/0043990 A1* | 2/2013 | Al-Jafar | 340/439 |
| 2014/0121902 A1* | 5/2014 | Moran et al. | 701/37 |

FOREIGN PATENT DOCUMENTS

| | | | | |
|---|---|---|---|---|
| JP | 2002-205630 A | | 7/2002 | |
| JP | 2004-351994 | * | 12/2004 | ........... B60W 30/00 |
| JP | 2009-184554 A | | 8/2009 | |
| JP | 2011-022990 A | | 2/2011 | |
| WO | WO 2011/007835 A1 | | 1/2011 | |

* cited by examiner

VEHICLE DRIVING SUPPORT APPARATUS

TECHNICAL FIELD

The present invention relates to a vehicle driving support technique of supporting a driver's driving to prevent a vehicle from approaching to an obstacle located rearward and sideward of the vehicle.

BACKGROUND ART

For example, a technique disclosed in Patent Document 1 is known as a conventional vehicle driving support apparatus. In the technique disclosed in Patent Document 1, when a driver's intention of lane change is detected and an obstacle is present rearward and sideward of a vehicle, approach to the obstacle is informed to the driver to prevent the approach to the obstacle. At this time, in the technique disclosed in Patent Document 1, the driver's operation of a direction indicator is detected, a position of the vehicle in a lane in the transverse direction (the position of a rightmost lane or leftmost lane) is detected, and the driver's intention of lane change is detected when the operating direction of the direction indicator is matched with the position of the vehicle in the lane in the transverse direction.

PRIOR ART DOCUMENT

Patent Document

Patent Document 1: Japanese Patent Application Publication No. 2009-184554 A

SUMMARY OF THE INVENTION

Problem to be Solved

However, for example, since drivers individually have preferences or habits for the travel position in a lane, it cannot be said that a driver necessarily travels at the center of a lane when the driver does not have an intention of lane change. Accordingly, the detection of an intention of lane change depending on the operation of the direction indicator and the travel position in the lane may have low detection accuracy. That is, even when a driver does not have an intention of approach to an obstacle, control for preventing the approach to the obstacle may intervene, which may give an uncomfortable feeling to the driver.

The present invention is made in view of the above-mentioned circumstances and an object thereof is to provide support control capable of further suppressing an uncomfortable feeling given to a driver when performing driving support for an obstacle rearward and sideward of the vehicle.

Solution to the Problem

In order to achieve the above-mentioned object, according to an aspect of the present invention, a road shape ahead of a vehicle is detected, and then, it is determined whether or not the driver has an intention of lane change on the basis of the detected road shape and the steering amount depending on steering by a driver. Additionally, in the present invention, an obstacle rearward and sideward of the vehicle is detected. Then, in the present invention, it is determined that approach prevention control for preventing the vehicle from approaching to the obstacle should starts, when it is determined that the driver has the intention of lane change and the obstacle is detected. When it is determined that the control should start, the approach prevention control for supporting prevention of the vehicle from approaching to the obstacle is performed. In the present invention, detection accuracy of the road shape ahead of the vehicle is determined. The determination of the start of the control is suppressed, when the detection accuracy is low.

Advantageous Effects of the Invention

According to an aspect of the present invention, the start of approach prevention control is suppressed when detection accuracy of a road shape is low. Accordingly, performing of unnecessary approach prevention control (intervention by unnecessary approach prevention control) is reduced when the detection accuracy in detecting a road shape is low. As a result, it is possible to further suppress an uncomfortable feeling given to a driver when performing driving support for an obstacle rearward and sideward of the vehicle.

DESCRIPTION OF EMBODIMENTS

Hereinafter, embodiments of the present invention will now be described with reference to the accompanying drawings.

First Embodiment

In this embodiment, an example will be described where a vehicle driving support apparatus is mounted on a rear-wheel-drive vehicle. In addition, a front-wheel-drive vehicle or a four-wheel-drive vehicle may be applied as a target vehicle. An EV vehicle or a hybrid vehicle may be applied.
(Configuration)

Figure 1:
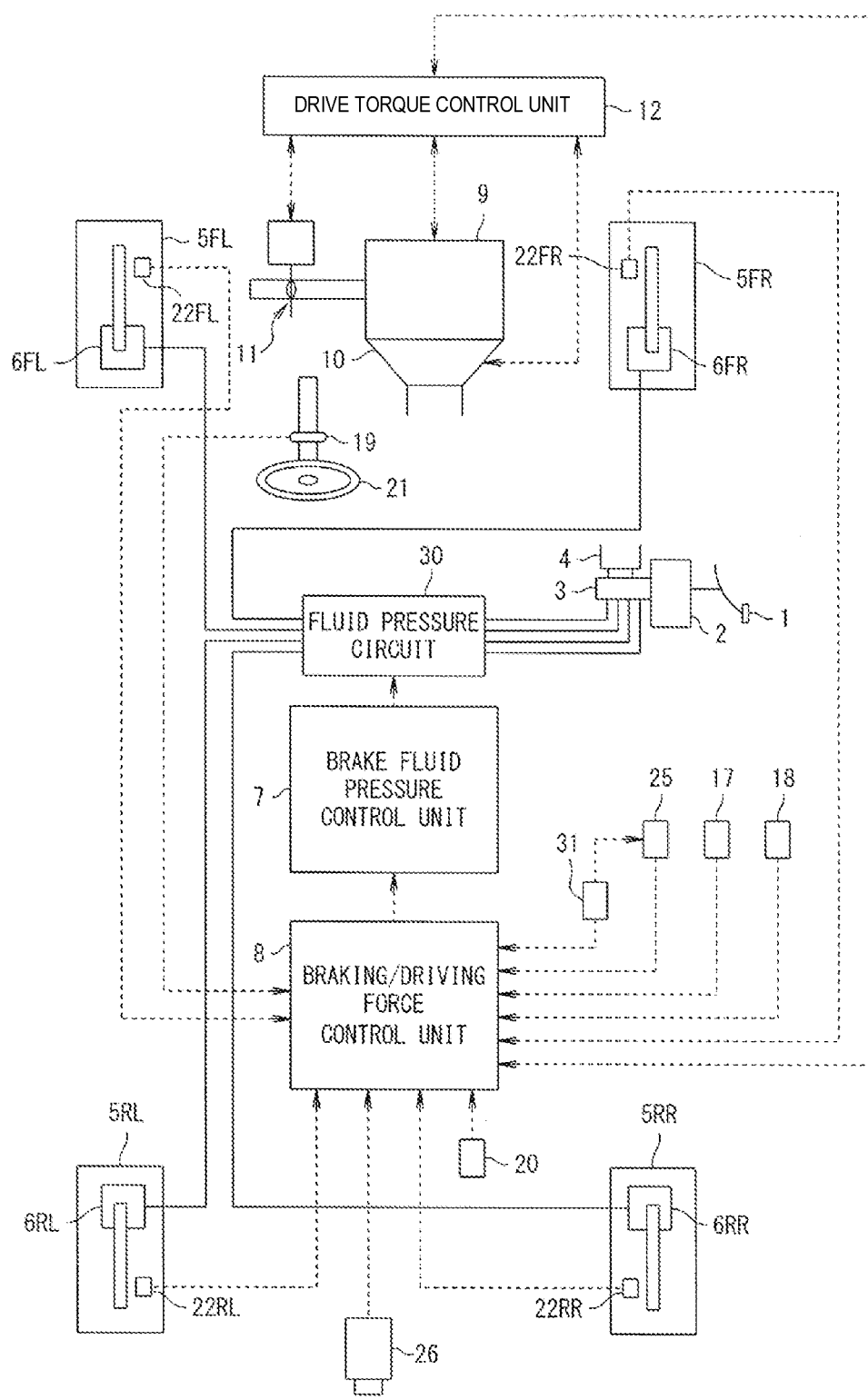
FIG. 1 is a diagram illustrating a schematic configuration of an apparatus according to a first embodiment of the present invention.

FIG. 1 is a diagram illustrating a schematic configuration of an apparatus according to this embodiment.

Reference numeral 1 in FIG. 1 represents a brake pedal. The brake pedal 1 is connected to a master cylinder 3 via a booster 2. Reference numeral 4 in FIG. 1 represents a reservoir.

The master cylinder 3 is connected to wheel cylinders 6FL to 6RR via a fluid pressure circuit 30. Accordingly, in a state where braking control is not operated, a brake fluid pressure is boosted up by the master cylinder 3 depending on the depression amount of the brake pedal 1 pressed by a driver. The boosted brake fluid pressure is supplied to the wheel cylinders 6FL to 6RR of wheels 5FL to 5RR via the fluid pressure circuit 30.

A brake fluid pressure control unit 7 controls an actuator in the fluid pressure circuit 30 and individually controls brake fluid pressures to the wheels. The brake fluid pressures to the wheels are controlled to a value corresponding to a command value from a braking/driving force control unit 8. As the actuator, a proportional solenoid valve capable of controlling the wheel cylinder fluid pressures to an arbitrary brake fluid pressure is used.

Here, the brake fluid pressure control unit 7 and the fluid pressure circuit 30 can employ a brake fluid pressure control unit which is used, for example, in an antiskid brake system (ABS), a traction control system (TCS), or a vehicle dynamics control system (VDC). The brake fluid pressure control unit 7 alone may be configured to control the brake fluid pressures of the wheel cylinders 6FL to 6RR. When a brake fluid pressure command value is input from the braking/driving force control unit 8 to be described later, the brake fluid pressures are controlled in accordance with the brake fluid pressure command value.

The vehicle includes a drive torque control unit 12 and a lane shape obtaining unit 25.

The drive torque control unit 12 controls drive torque to the rear wheels 5RL and 5RR as drive wheels. This control is realized by controlling an operating state of an engine 9, a selected transmission gear ratio of an automatic transmission 10, and a throttle opening degree of a throttle valve 11. That is, the drive torque control unit 12 controls an amount of fuel injected or an ignition timing. At the same time, the drive torque control unit 12 controls the throttle opening degree. Accordingly, the drive torque control unit 12 controls the operating state of the engine 9.

The drive torque control unit 12 alone may control the drive torque of the rear wheels 5RL and 5RR. Here, when a drive torque command value is input from the braking/driving force control unit 8, the torque of the drive wheels is controlled in accordance with the drive torque command value.

The vehicle also includes an imaging unit 26 having an image processing function. The imaging unit 26 includes a camera, and processes and outputs an image captured with the camera. The camera includes a CCD (Charge Coupled Device) camera, etc. disposed to take an image rearward and sideward of the vehicle.

Figure 2:
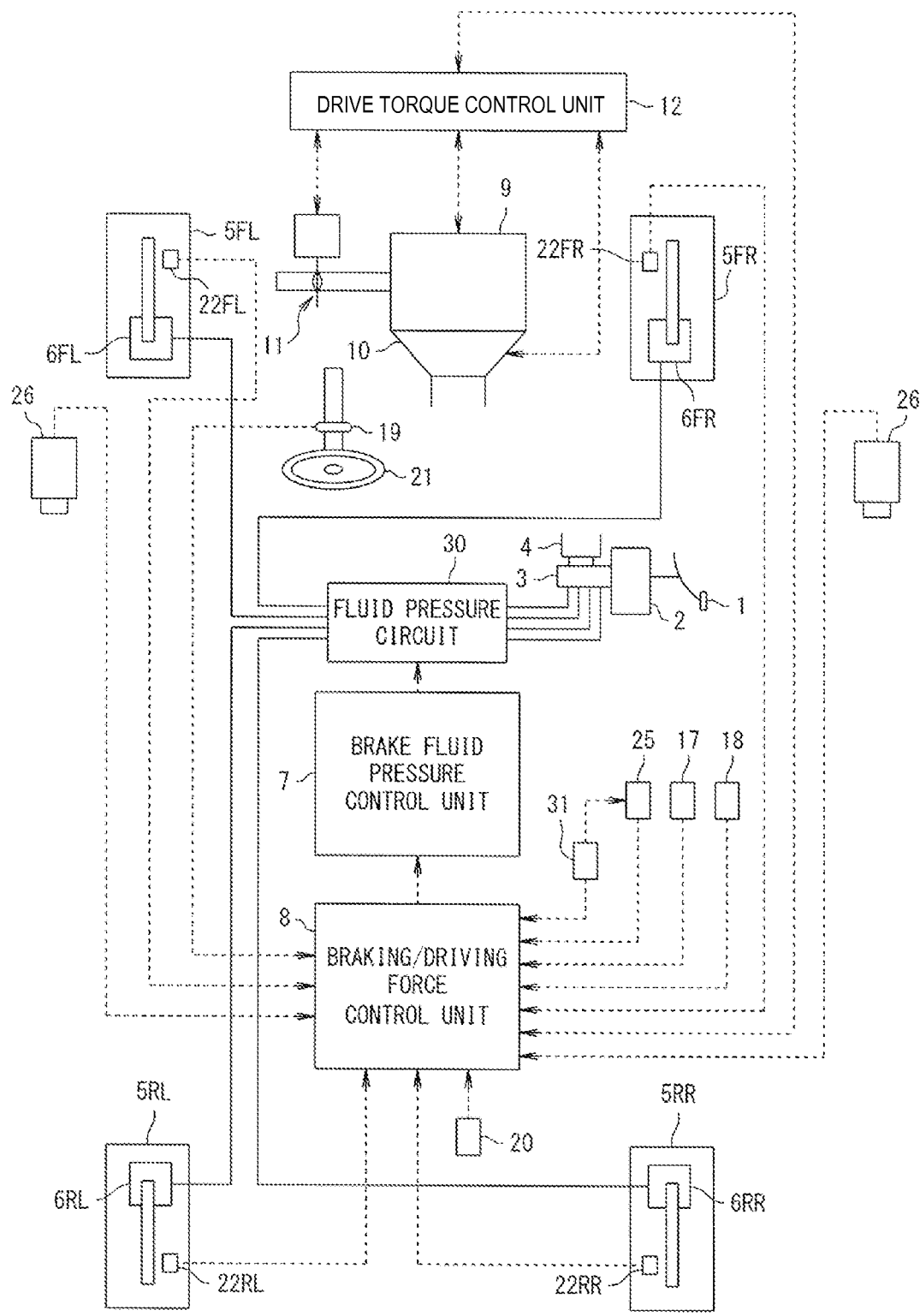
FIG. 2 is a diagram illustrating another schematic configuration of the apparatus according to the first embodiment of the present invention.

Here, the term "rearward and sideward of a vehicle" in this specification means rearward of a vehicle MM including sideward of the vehicle. In FIG. 1, a rear camera disposed on the back of the vehicle is exemplified as the camera of the imaging unit 26. The camera of the imaging unit 26 may be one of side cameras which are generally disposed below left and right mirrors as illustrated in FIG. 2.

The imaging unit 26 detects a lane dividing line such as a white line (lane marker) from the captured image and detects a travel lane on the basis of the detected white line. The imaging unit 26 detects a transverse displacement X of the vehicle MM relative to the travel lane on the basis of the detected travel lane, and outputs the detected transverse displacement X to the braking/driving force control unit 8 to be described later. Then, as described later, the braking/driving force control unit 8 calculates a yaw angle φ on the basis of the detected transverse displacement X. Accordingly, the yaw angle φ calculated by the braking/driving force control unit 8 is greatly affected by detection accuracy S of a white line by the imaging unit 26.

Here, a navigation apparatus 31 is mounted on the vehicle. The navigation apparatus 31 includes map data in which map information is stored. The navigation apparatus 31 outputs path information set on the basis of an input of a destination by a driver along with the road information and the other map information to the braking/driving force control unit 8.

The apparatus according to this embodiment detects a road curvature β by the use of the navigation apparatus 31. The method of detecting the road curvature β will be described later.

Figure 3:
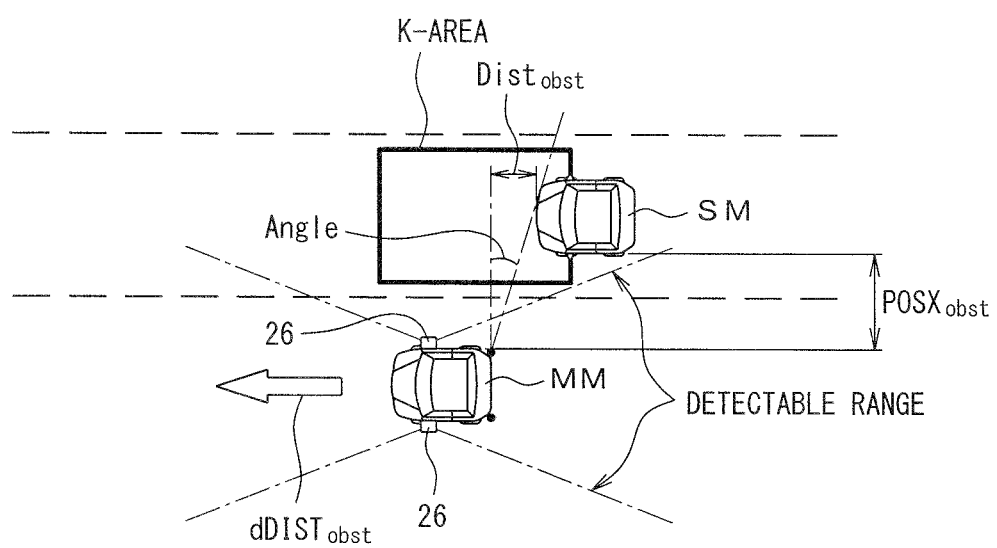
FIG. 3 is a conceptual diagram illustrating an obstacle detection area rearward and sideward of a vehicle and others.

The imaging unit 26 detects presence of an obstacle SM which travels rearward and sideward of the vehicle on the basis of an image of rearward and sideward of the vehicle captured with the camera. The imaging unit 26 can preferably detect a relative transverse position POSXobst, a relative longitudinal position DISTobst, a relative longitudinal velocity dDISTobst between the vehicle MM and the obstacle SM, on each of the left and right sides individually (see FIG. 3). The relative transverse position POSXobst represents a position of the obstacle in the lane width direction relative to the vehicle MM. The relative longitudinal position DISTobst represents a position of the obstacle in a direction perpendicular to the lane width direction (a position of the obstacle in a direction parallel to the lane) relative to the vehicle MM. The relative longitudinal velocity dDISTobst represents a relative velocity in the traveling direction of the vehicle MM. In FIG. 3, a side camera is exemplified as the camera.

Then, this vehicle includes a master cylinder pressure sensor 17, an accelerator opening degree sensor 18, a steering angle sensor 19, a direction indicating switch 20, and wheel speed sensors 22FL to 22RR. These sensors output detected detection signals to the braking/driving force control unit 8.

The master cylinder pressure sensor 17 detects an output pressure of the master cylinder 3, that is, a master cylinder fluid pressure Pm. The accelerator opening degree sensor 18 detects a depression amount of an accelerator pedal, that is, an accelerator opening degree θt. The steering angle sensor 19 detects a steering angle (steering rudder angle) δ of the steering wheel 21. The direction indicating switch 20 detects a direction indicating operation on the direction indicator. The wheel speed sensors 22FL to 22RR detect rotational speeds of the wheels 5FL to 5RR, that is, wheel speeds Vwi (i=fl, fr, rl, rr).

Figure 4:
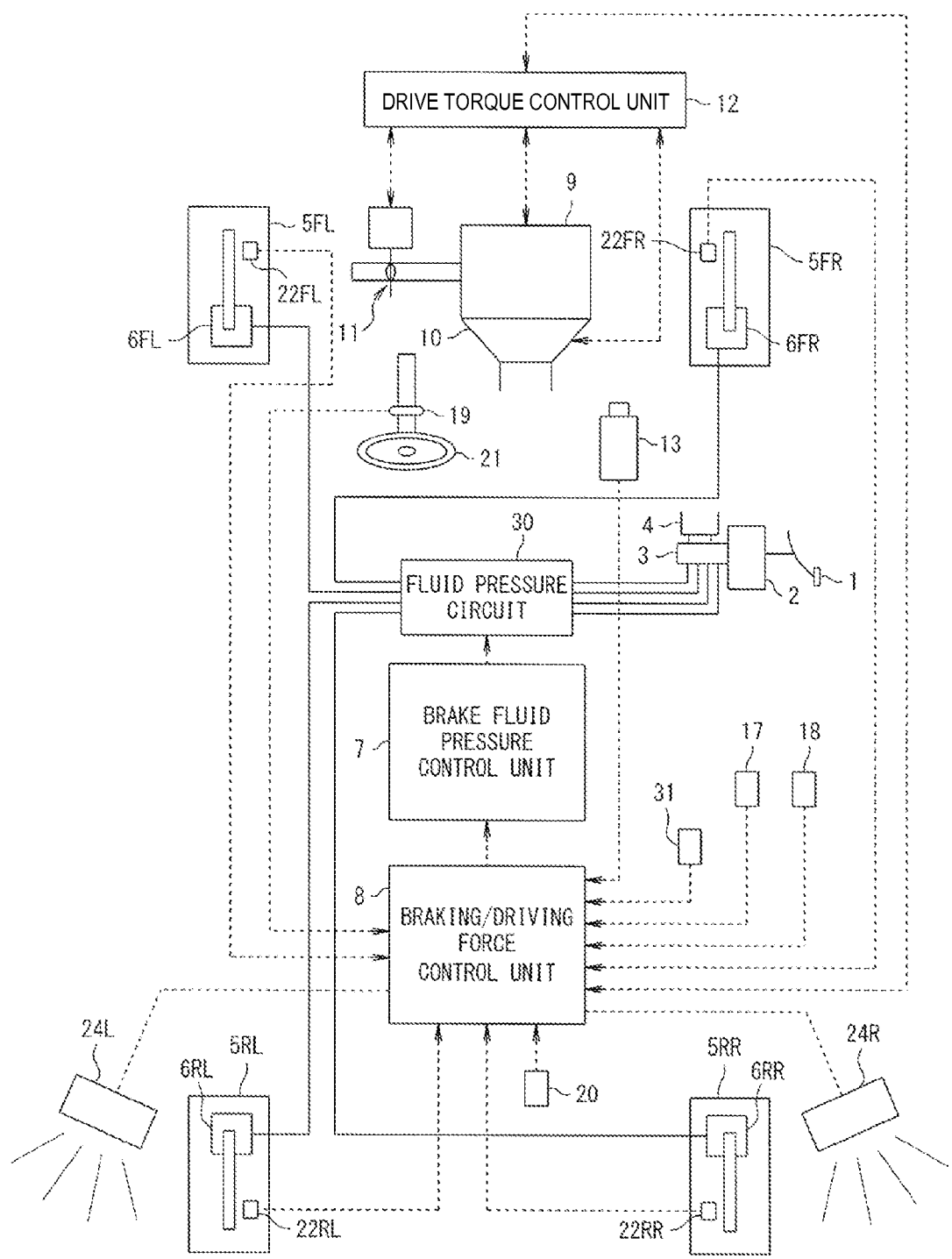
FIG. 4 is a diagram illustrating another schematic configuration of the apparatus according to the embodiment of the present invention.

In addition, in the above description, a configuration of detecting the presence of an obstacle SM rearward and sideward of the vehicle or a state of the vehicle MM relative to the travel lane (a yaw angle or a transverse position) on the basis of the image captured with the camera of the imaging unit 26 is exemplified. However, the detection of an obstacle SM is not limited to this example. For example, as illustrated in FIG. 4, a configuration of including millimeter wave radars 24L/24R for detecting an obstacle SM rearward and sideward of the vehicle and detecting the obstacle SM with the millimeter wave radars 24L/24R may be employed. A configuration of including a front camera 13 for capturing an image ahead of the vehicle MM, detecting the travel lane on the basis of an image captured with the front camera 13, and detecting a state (a transverse displacement X) relative to the travel lane of the vehicle MM may be employed.

The lane shape obtaining unit 25 obtains a lane shape (lane shapes such as the width and the curvature β of a lane) within a preset forward area set ahead of the vehicle MM, that is, within a preset forward distance, as information of a road shape and outputs the obtained lane shape to the braking/driving force control unit 8. Specifically, the lane shape obtaining unit 25 detects a shape of a lane within a preset forward distance in the traveling direction from the current position of the vehicle MM, for example, on the basis of map information of the navigation apparatus 31 and outputs the detected lane shape to the braking/driving force control unit 8. Here, the lane shape obtaining unit 25 may include a front camera 13 for capturing an image ahead of the vehicle MM, may detect a lane dividing line such as a white line (lane marker) from the image captured with the front camera 13, and may detect the lane shape on the basis of the detected lane dividing line. The lane shape obtaining unit 25 may detect the lane shape on the basis of data transmitted from road infrastructure (such as VICS (registered trademark)) outside the vehicle.

Here, the braking/driving force control unit 8 and the lane shape obtaining unit 25 each include a controller having a micro computer and peripheral circuits thereof. The lane shape obtaining unit 25 may be configured to be independent of the braking/driving force control unit 8, but in the following description, the lane shape obtaining unit 25 is configured as apart of a process (program) which is performed by the braking/driving force control unit 8.

Figure 5:
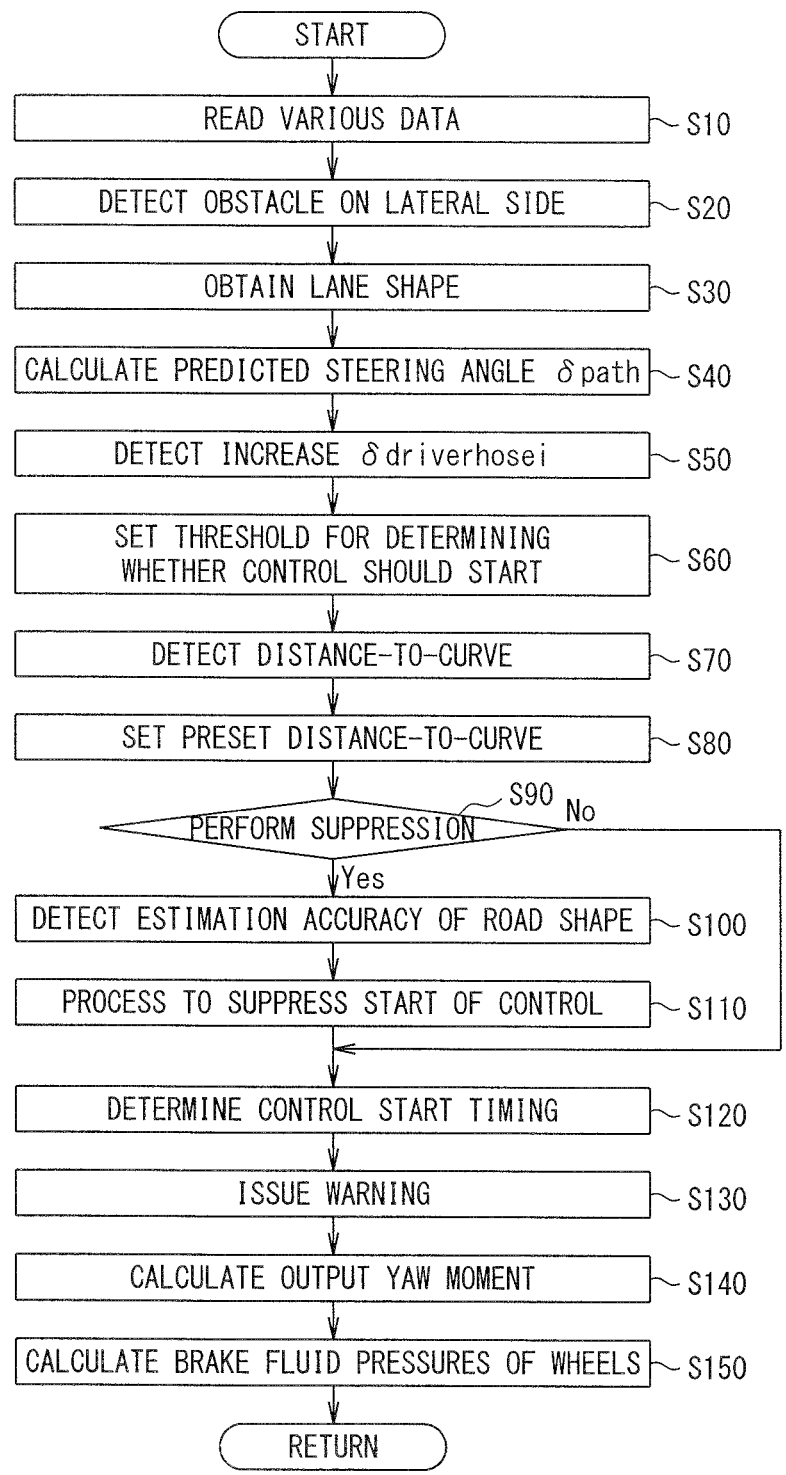
FIG. 5 is a flowchart illustrating an example of a processing procedure in a control unit in the first embodiment.

FIG. 5 is a flowchart illustrating a calculating processing procedure of driving support control which is performed by the braking/driving force control unit 8.

The calculating processing procedure of the driving support control is performed by a timer interruption every preset sampling time ΔT. The calculating processing procedure of the driving support control is performed by the timer interruption, for example, every 10 msec. In addition, the processing procedure illustrated in FIG. 5 is not provided with a communication process, but information obtained through the calculating process is frequently stored in a storage device to update the information in the storage device, and necessary information is frequently read from the storage device.

The calculating processing procedure of the driving support control will be described below with reference to FIG. 5.

First, in step S10, the braking/driving force control unit 8 reads various data from the sensors, the controllers, or the control units. Specifically, the braking/driving force control unit 8 reads the wheel speeds Vwi, the steering angle δ, the master cylinder fluid pressure Pm, and the switch signal of the direction indicator which are detected by the sensors and calculates the vehicle velocity V of the vehicle MM.

The vehicle velocity V is calculated using Expression (1), for example, on the basis of the read wheel speeds Vwi.

"In the Case of Front Wheel Drive"

$$V=(Vwrl+Vwrr)/2$$

"In the Case of Rear Wheel Drive"

$$V=(Vwfl+Vwfr)/2$$

Here, Vwfl and Vwfr represent the wheel speeds of the left and right front wheels and Vwrl and Vwrr represent the wheel speeds of the left and right rear wheels, respectively. That is, in Expression (1), the vehicle velocity V is calculated as an average value of the wheel speeds of the follower wheels. In this embodiment, since the vehicle is a rear-wheel-drive vehicle, the vehicle velocity V is calculated using the latter expression, that is, the wheel speeds of the front wheels.

When ABS (Anti-lock Brake System) control or the like works, an estimated vehicle velocity estimated in the ABS control may be used as the vehicle velocity V.

In step S20, a process of detecting an obstacle SM is performed. That is, in step S20, the braking/driving force control unit 8 detects presence 'Lobst' and 'Robst' of an obstacle SM (obstacle SM rearward and sideward of the vehicle) in the respective obstacle detection areas K-AREA set on the right side and the left side of the vehicle MM.

Specifically, in the determination of presence of the obstacle SM, when the obstacle SM is present within a preset given relative position range (hereinafter, obstacle detection area K-AREA) set for the vehicle, it is determined that the obstacle SM is present.

That is, the braking/driving force control unit 8 determines that the obstacle SM is present when the image of the obstacle SM is present within a range, in the image captured with the camera of the imaging unit 26, corresponding to the obstacle detection areas K-AREA set rearward and sideward of the vehicle. Alternatively, the braking/driving force control unit 8 may detect a position of the obstacle SM relative to the vehicle MM by the use of the image captured with the camera and may determine that the obstacle SM is present when the detected relative position is within the obstacle detection areas K-AREA. When the millimeter wave radars 24L/24R (see FIG. 4) is provided, the braking/driving force control unit 8 may determine that the obstacle SM is present when the position of the obstacle SM, which is detected by the radar, relative to the vehicle MM is within the obstacle detection areas K-AREA. When the position of the obstacle SM relative to the vehicle MM can be detected as described above, the braking/driving force control unit 8 may calculate a time until the obstacle SM reaches the obstacle detection area K-AREA on the basis of a variation in the relative position of the obstacle SM, may predict that the obstacle SM enters the obstacle detection area K-AREA when the calculated time is less than a preset time Tobstdetect arbitrarily set in advance, and may determine that the obstacle SM is present.

Then, in step S30, the braking/driving force control unit 8 obtains map information of the preset forward area F-AREA which is a predetermined area set ahead of the vehicle MM with reference to map information of the navigation apparatus 31. Then, the braking/driving force control unit 8 obtains a curvature β (lane shape) of the travel lane of the vehicle MM as road shape information on the basis of the obtained map information.

For example, the braking/driving force control unit 8 obtains nodes in the preset forward area F-AREA from the current position of the vehicle MM on the basis of the map information stored in the navigation apparatus 31, calculates an approximate curve connecting the obtained nodes, and obtains a curvature β of the calculated approximate curve as the curvature β of the travel lane. The current position of the vehicle MM can be detected using a GPS receiver of the navigation apparatus 31 or the like.

Figure 6:
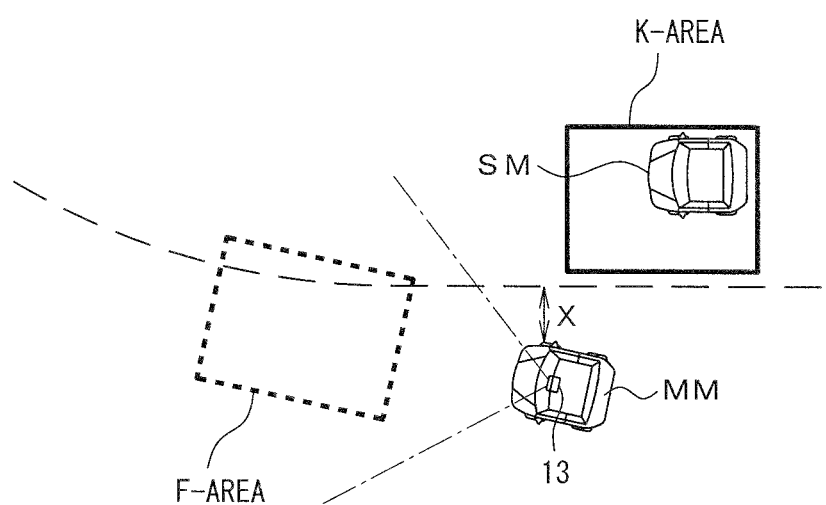
FIG. 6 is a conceptual diagram illustrating a relationship between a vehicle and an obstacle.

The method of obtaining the curvature β of the travel lane is not limited to the above-mentioned method. For example, when the curvature β corresponding to a road is included as road information in the map information, the braking/driving force control unit 8 may obtain the curvature β of the travel lane by reading the curvature β stored as the road information. Alternatively, as illustrated in FIG. 6, a front camera 13 for capturing an image ahead of the vehicle MM may be provided, the image captured with the front camera 13 may be processed, and candidate points on a lane marker may be extracted through detection of edges. In this case, a line segment passing through the extracted candidate points may be detected as the shape of the lane marker and the curvature β of the travel lane may be obtained from the detected shape of the lane marker.

The braking/driving force control unit 8 may obtain information on the road shape ahead of the vehicle MM through the use of road-vehicle communication with an infrastructure (road infrastructure) such as VICS (registered trademark) or inter-vehicle communication with another vehicle traveling ahead thereof, instead of obtaining the curvature β on the basis of the map information of the navigation apparatus 31. That is, for example, when information of nodes can be received from the infrastructure or another vehicle, the nodes in the preset forward area F-AREA set ahead of the vehicle MM based on the current position of the vehicle MM are obtained on the basis of the received nodes, a curve connecting the nodes is calculated, and the curvature β of the calculated curve is obtained as the curvature β of the travel lane. When information on the road curvature β can be received from the infrastructure or another vehicle, the received curvature can be obtained as the curvature β of the travel lane.

In step S30, the yaw angle φ is calculated from the transverse displacement X on the basis of the following expression.

$$\varphi = \tan^{-1}(V/dX'(=dY/dX)) \qquad (2)$$

Here, dX represents a variation of the transverse displacement X per unit time, dY represents a variation in the traveling direction (a side along a lane) per unit time, and dX' represents the differential value of the variation dX. Here, the symbol "'" represents a first differential.

Then, in step S40, a predicted steering angle δpath is calculated using the curvature β of the travel lane obtained as forward curve information. The predicted steering angle δpath is a steering angle necessary for the vehicle MM to maintain the traveling path, that is, a steering angle necessary for causing the vehicle MM to travel along the travel lane. The predicted steering angle δpath is calculated by multiplying the curvature β by a gain WBg predetermined depending on the vehicle dimensions (wheelbase).

Then, in step S50, a deviation angle δdriverhosei which is an increase of the steering angle in the lane change by the driver of the vehicle MM is detected on the basis of the following expression. The deviation angle δdriverhosei of the steering angle is a deviation between the current steering angle δ and the predicted steering angle δpath which is a steering angle for causing the vehicle MM to travel along the travel lane. That is, the deviation angle δdriverhosei is a steering amount which is an index for determining whether the driver of the vehicle MM has an intention of lane change.

$$\delta driverhosei = \delta - \delta path \qquad (3)$$

Then, in step S60, an initial value of a preset deviation angle δth is set, the preset deviation angle δth being used to determine whether or not approach prevention control of suppressing an approach of the vehicle MM to the obstacle SM should start.

The preset deviation angle δth is a threshold value for detecting the driver's intention of lane change.

The preset deviation angle δth is stored as a map corresponding to the vehicle velocity so that as the higher the vehicle velocity becomes, the smaller the value thereof becomes, and is obtained and set by retrieving it from the map on the basis of the vehicle velocity.

The preset deviation angle δth may be set so that the closer the vehicle MM is to a white line (the smaller the transverse displacement X is), the smaller the value thereof is. In this case, for example, the preset deviation angle δth can be obtained by correcting the preset deviation angle δth determined by retrieving it from the map, by multiplying it by a coefficient of 1 or less that becomes smaller as the vehicle MM becomes closer to the white line.

Alternatively, the preset deviation angle δth may be set so that the closer the vehicle MM is to the obstacle SM, the smaller the value thereof is. In this case, for example, the preset deviation angle δth can be obtained by correcting the preset deviation angle δth determined by retrieving it from the map, by multiplying it by a coefficient of 1 or less that becomes smaller as the vehicle MM becomes closer to the obstacle SM.

In step S70, a distance-to-curve is detected, the distance-to-curve being a distance from the current position of the vehicle MM to a start position of a curved road present ahead in the traveling direction of the vehicle MM. Specifically, in step S70, the current position of the vehicle MM is detected based on GPS information, and the distance-to-curve is detected based on the detected current position and the map information stored in the navigation apparatus 31. The distance-to-curve is defined as a distance DISTtocurve [m] along the lane from a start point (at which the absolute value of the curvature β is equal to or more than a predetermined value) of a curve ahead in the traveling direction to a point at which the vehicle is located on the map.

In step S80, a process of setting a preset distance-to-curve is performed.

Specifically, the preset distance-to-curve is set so that the lower the accuracy Sx of the distance-to-curve which is a distance from the current position of the vehicle MM to the curve becomes, the larger the value thereof becomes. The accuracy Sx of the distance-to-curve is determined, for example, depending on the location accuracy Sx of the vehicle MM.

Regarding the position of the vehicle MM, the position of the vehicle MM is detected by receiving radio waves from plural GPS satellites and calculating the distances from the GPS satellites from which the radio wave is received. Accordingly, the larger the number of GPS satellites (the number of GPS satellites obtained) from which the radio wave is received becomes, the higher the detection accuracy Sx (location accuracy) of the position of the vehicle MM becomes. Accordingly, for example, the accuracy Sx of the distance-to-curve is defined as low when the number of information pieces obtained from the GPS satellites is equal to or less than three, the accuracy Sx of the distance-to-curve is defined as middle when the number of information pieces obtained from the GPS satellites is four or five, and the accuracy Sx of the distance-to-curve is defined as high when the number of information pieces obtained from the GPS satellites is equal to or more than six. The GPS satellites of which the positions are located less than a predetermined distance are counted as one. When the state where the accuracy Sx is high is changed to any state where the accuracy is middle or low, it may be determined that the setting of the accuracy Sx should change after the traveling distance after the state change is equal to or more than a predetermined distance. At this time, on the contrary, when the accuracy Sx is changed from the low state to the high state, the determination of the accuracy Sx is performed without any delay. In this way, the location accuracy Sx (accuracy of the distance-to-curve) of the vehicle MM is repeatedly calculated and updated with a predetermined time cycle.

Then, in step S80, the preset distance-to-curve is set depending on the accuracy Sx of the distance-to-curve. That is, the lower the accuracy Sx of the distance-to-curve becomes, the larger value than the initial value the preset distance-to-curve is set. For example, when the accuracy Sx is middle, the preset distance-to-curve is set to a predetermined distance X [m]. When the accuracy Sx is high, the preset distance-to-curve is set to a value obtained by multiplying the predetermined distance X [m] by a coefficient Gain-high (for example, 0.5). When the accuracy Sx is low, the preset distance-to-curve is set to a value obtained by multiplying the predetermined distance by a coefficient Gain-low (for example, 1.5).

Here, the preset distance-to-curve may be changed depending on the vehicle velocity of the vehicle MM. Specifically, the higher the vehicle velocity is, the smaller the preset distance-to-curve is set. This is synonymous with using a time-to-curve as the preset distance-to-curve.

Here, a process of changing the relative position of the preset forward area F-AREA to the vehicle MM may be performed depending on the preset distance-to-curve.

Then, in step S90, when the distance-to-curve is less than the preset distance-to-curve, a start suppressing process is not performed, and the processing procedure progresses to step S120. On the other hand, when the distance-to-curve is equal to or more than the preset distance-to-curve, the processing procedure progresses to step S100.

Then, in step S100, the detection accuracy S of the curvature β (lane shape) of a detected forward curve is calculated. The detection accuracy S of the curvature β of the forward curve is calculated, for example, as follows.

When the curvature β (lane shape) is detected on the basis of the nodes in the map information stored in the navigation apparatus 31, the number N1 of detected points of the nodes (the number of points within a predetermined distance) present in the preset forward area F-AREA is information indicating recognition situation. Accordingly, in step S100, the larger the number of detected nodes is, the higher the accuracy S is determined to be.

For example, the accuracy S1 is calculated using the following expression.

$$S1 = N1/Nn0 \qquad (4)$$

Here, when S1>1, S1=1 is set.

$$S = S1$$

Here, Nn0 represents the reference number of nodes and is the number with which it is estimated that the accuracy S of the detected curvature β is high when the number of nodes is equal to or more than the number of nodes Nn0. In this case, when S1 is equal to 1, the detection accuracy S of the curvature β as the road shape information can be determined to be high. On the other hand, the smaller S1 is, the lower the detection accuracy S is detected to be.

Alternatively, an approximate curve connecting the detected nodes is drawn, a degree of variance N2 of distances from the approximate curve to the nodes is calculated, and the smaller the degree of variance is, the higher the accuracy S is determined to be.

For example, the accuracy S2 is calculated using the following expression.

$$S2 = N2/Nb0 \qquad (5)$$

Here, when S2>1, S2=1 is set.

$$S = S2$$

Here, Nb0 represents the degree of variance as a reference and is the number with which it is estimated that the accuracy S of the detected curvature β is high when the degree of variance is equal to or more than Nb0. In this case, when S2 is equal to 1, the detection accuracy S of the curvature β as the road shape information can be determined to be high. On the other hand, the smaller S2 is, the lower the detection accuracy S is detected to be.

Here, as expressed by the following expression, both the accuracy S1 based on the number of detected nodes and the accuracy S2 based on the degree of variance may be combined and may be used as the final accuracy S.

$$S = S1 \cdot S2 \qquad (6)$$

In this case, when S is equal to 1, the detection accuracy S of the curvature β as the road shape information can be determined to be high. On the other hand, the smaller S is, the lower the detection accuracy S can be determined to be.

Here, the method of determining the detection accuracy S of the road shape is not limited to the above-mentioned method. For example, the reliability of detection of the nodes may be calculated on the basis of the distances from the approximate curve to the nodes, and the detection accuracy S of the road shape may be calculated on the basis of the reliability of detection and the number of nodes. Specifically, for example, distances (deviation) from the approximate curve to the nodes are calculated, the reliability of the node of which the calculated distance from the approximate curve is 0 is set to 100%, and the larger the distance from the approximate curve is, the lower reliability of the node is set to be. The average value of the reliability of detection of all the nodes is multiplied by the number of detected nodes and the result is set as the detection accuracy S of the road shape. In this case, for example, in an area from which 10 nodes are normally detected, the detection accuracy is calculated as S=1 when the average value of the reliability of detection is 100% and the number of nodes is 10, and the detection accuracy is calculated as S=0.5 when the average value of the reliability of detection is 50% and the number of nodes is 10.

Here, when the curvature β of a curve is stored as map information and the stored road curvature β is read to obtain the curvature β, the accuracy S can be determined on the basis of the nodes as described above. That is, the road shapes stored in the map information of the navigation are generally prepared on the basis of the nodes. Accordingly, since the larger the number of nodes within a predetermined distance is, the higher the accuracy S of the curvature β of the curve stored as the map information is considered to be, it is possible to determine the accuracy S on the basis of the nodes as described above.

Then, in step S110, a process of suppressing a start of obstacle approach prevention control (a process of making it difficult to determine that the control should start) is performed depending on the detection accuracy S of the curvature β (lane shape) which is the road shape information.

Here, a case where the start of the obstacle approach prevention control is suppressed by changing the preset deviation angle θth for determining the driver's lane changing operation is described.

That is, depending on the detection accuracy S of the curvature β (lane shape) calculated in step S100, the lower the accuracy S is, the larger the preset deviation angle δth is set to be.

For example, the preset deviation angle δth (the preset deviation angle δth used in step S120) is stored in advance in a map or the like such that the lower the detection accuracy S becomes, the larger the value of the preset deviation angle difference dth becomes. Then, the preset deviation angle δth is set by retrieving it from the map depending on the detection accuracy S of the detected curvature β. In this case, the process of step S60 may be performed herein.

Alternatively, the preset deviation angle δth may be corrected such that the preset deviation angle δth becomes larger as the detection accuracy S of the curvature β becomes lower, by setting a correction coefficient (>1) in which the lower the detection accuracy S of the curvature β becomes, the larger the value thereof becomes, and performing a process of calculating the final deviation angle δth by multiplying the preset deviation angle δth by the correction coefficient.

Then, in step S120, it is determined whether the control should start. Specifically, it is determined whether the deviation angle δdriverhosei calculated in step S50 is larger than the preset deviation angle δth.

When the deviation angle δdriverhosei is larger than the preset deviation angle δth, the obstacle approach prevention control determination flag Fout_obst is set to ON. On the other hand, when the deviation angle δdriverhosei is equal to or less than the preset deviation angle δth, the obstacle approach prevention control determination flag Fout_obst is set to OFF.

When the direction of the lane change by steering is different from the detection direction of the obstacle SM, it is not necessary to perform the approach prevention control. Accordingly, the process of changing the obstacle approach prevention control determination flag from OFF to ON is not performed.

The determination on whether the obstacle approach prevention control determination flag Fout_obst should be set to OFF may be made to have hysteresis of F with respect to the determination on whether the obstacle approach prevention control determination flag Fout_obst should be set to ON, such as "δdriverhosei<δth−F".

Here, a condition for allowing the obstacle approach prevention control determination flag Fout_obst to be set to ON is assumed to a case where the obstacle approach prevention control determination flag Fout_obst is set to OFF. As a condition for allowing the obstacle approach prevention control determination flag Fout_obst to be set to ON, a temporal condition may be added such as a condition in which a predetermined time passes after the obstacle approach prevention control determination flag Fout_obst is set to OFF. Here, when a predetermined time Tcontrol passes after the obstacle approach prevention control determination flag Fout_obst is set to ON, the obstacle approach prevention control determination flag may be set to Fout_obst=off to terminate the control.

Hereinafter, the obstacle approach prevention control determination flag Fout_obst is simply referred to as the obstacle approach prevention control determination flag.

When the obstacle approach prevention control determination flag is set to ON, the control performing direction Dout_obst is determined. When a driver steers the steering wheel to the left and the obstacle approach prevention control determination flag is set to ON, Dout_obst is set to LEFT. When the driver steers the steering wheel to the right and the obstacle approach prevention control determination flag is set to ON, Dout_obst is set to RIGHT.

When an antiskid brake system (ABS), a traction control system (TCS), or a vehicle dynamic control system (VDC) works, the obstacle approach prevention control determination flag may be set to OFF so as not to perform the obstacle approach prevention control.

Then, in step S130, a process of issuing a warning is performed. Specifically, the deviation angle δdriverhosei calculated in step S50 is larger than a predetermined threshold value δth1, the process of issuing a warning sound is performed.

The threshold value δth1 used to determine whether or not a warning should be issued may be the same as the threshold value δth used for the determination of step S120. Here, it is preferable that the threshold value δth1 be set to be smaller than the threshold value δth and it be determined that a warning sound is issued when δdriverhosei is larger than the set threshold value.

Then, in step S140, a target yaw moment Ms_str is set.
The target yaw moment Ms_str is calculated using the following expression.
"In the Case where Obstacle Approach Prevention Control Determination Flag is ON"

$$Ms\_str = K1recv \times K2recv \times Xs$$

$$\Delta Xs = (K0 \cdot \Delta X + K1mom \cdot \phi + K2mom \cdot \delta driverhosei)$$

"In the Case where Obstacle Approach Prevention Control Determination Flag is OFF"

$$Ms\_str = 0 \tag{7}$$

Here, K1recv represents a proportional gain determined depending on the vehicle dimensions and K2recv represents a gain varying depending on the vehicle velocity V. For example, the gain K2recv has a predetermined first value in a low-velocity zone, has a relationship reversely proportional to the vehicle velocity V when the vehicle velocity V reaches a certain value, and has a constant value smaller than the first value when the vehicle velocity V reaches a certain velocity thereafter. K0, K1mom, and K2mom are gains appropriately set by Experiments or the like. ΔX represents a variation of a transverse displacement per unit time and a variation in a direction in which the vehicle MM approaches to a white line is defined as positive.

According to Expression (7), as there is an increase in a yaw angle φ with the white line or a yaw rate steadily generated by causing a driver to increase the steering amount in a direction getting close to the white line, the target yaw moment Ms_str increases.

Then, in step S150, a process of generating a yaw rate for preventing an approach to the obstacle is performed. Here, the yaw moment is generated using a brake. A method for outputting Ms will be specifically described below.

When the target yaw moment Ms_str is "0", that is, when a determination result in which it is determined that yaw moment control is not performed as the approach prevention control is obtained, target brake fluid pressures Psi (i=fl, fr, rl, rr) of the wheels are set to the brake fluid pressure Pmf and Pmr as expressed by Expressions (8) and (9).

$$Psfl = Psfr = Pmf \tag{8}$$

$$Psrl = Psrr = Pmr \tag{9}$$

Here, Pmf represents the brake fluid pressure for front wheels. Pmr represents the brake fluid pressure for rear wheels and is a value calculated on the basis of the brake fluid pressure Pmf for front wheels in consideration of the front and rear distribution. Pmf and Pmr are values corresponding to degrees of operation (master cylinder fluid pressure Pm) in a driver's braking operation.

On the other hand, when the absolute value of the target yaw moment Ms_str is larger than 0, that is, when it is determined that the obstacle approach prevention control should start, the front target brake fluid pressure difference ΔPsf and the rear target brake fluid pressure difference ΔPsr are calculated on the basis of the target yaw moment Ms_str. Specifically, the target brake fluid pressure differences ΔPsf and ΔPsr are calculated using Expressions (10) and (11).

$$\Delta Psf = 2 \cdot Kbf \cdot (Ms \times FRratio)/T \tag{10}$$

$$\Delta Psr = 2 \cdot Kbr \cdot (Ms \times (1 - FRratio))/T \tag{11}$$

Here, FRratio represents the distribution of the braking force to the front and rear wheels. T represents the tread. The tread T is treated as having the same value for the front and rear wheels, for convenience. Kbf and Kbr are conversion coefficients for the front and rear wheels when a braking force is converted into a brake fluid pressure and is determined depending on the brake specifications.

In this way, the braking force generated from the wheels is distributed depending on the magnitude of the target yaw moment Ms_str, and a predetermined value is given to the target brake fluid pressure differences ΔPsf and ΔPsr to cause a braking force difference between the left front and right front wheels and between the left rear and the right rear wheels. The final target brake fluid pressures Psi (i=fl, fr, rl, rr) of the wheels are calculated using the calculated target brake fluid pressure differences ΔPsf and ΔPsr.

Specifically, when the absolute value of the target yaw moment Ms_str is larger than 0 and the control performing direction Dout_obst is set to LEFT, that is, when the obstacle approach prevention control on the obstacle SM on the left side is performed, the target brake fluid pressures Psi (i=fl, fr, rl, rr) of the wheels are calculated using Expression (12).

$$Psfl=Pmf$$

$$Psfr=Pmf+\Delta Psf$$

$$Psrl=Pmr$$

$$Psrr=Pmr+\Delta Psr \quad (12)$$

When the absolute value of the target yaw moment Ms_str is larger than 0 and the control performing direction Dout_obst is set to RIGHT, that is, when the obstacle approach prevention control on the obstacle SM on the right side is performed, the target brake fluid pressures Psi (i=fl, fr, rl, rr) of the wheels are calculated using Expression (13).

$$Psfl=Pmf+\Delta Psf$$

$$Psfr=Pmf$$

$$Psrl=Pmr+\Delta Psr$$

$$Psrr=Pmr \quad (13)$$

According to Expressions (12) and (13), a braking force difference between the left and right wheels is generated so that the braking force of the wheels on the inside of the lane of the vehicle MM.

Here, as expressed by Expressions (12) and (13), the target brake fluid pressures Psi (i=fl, fr, rl, rr) of the wheels are calculated in consideration of the driver's operation on the brake, that is, the brake fluid pressures Pmf and Pmr.

The braking/driving force control unit 8 outputs the target brake fluid pressures Psi (i=fl, fr, rl, rr) of the wheels calculated in this way as the brake fluid pressure command values to the brake fluid pressure control unit 7.

In the above description, an example where a yaw rate is generated in the vehicle by generating the braking force difference between the left and right wheels of the vehicle is described, but the technique of generating a yaw rate in a vehicle is not limited to this. For example, when a steering angle controller controlling the steering angle of the steering wheel is used as the technique of generating a yaw rate, a target steering angle STRθ may be calculated by STRθ=Ka× Ms and the actual steering angle may be controlled to vary by the target steering angle STRθ to the opposite side of the side on which the obstacle SM is present. The coefficient Ka is a coefficient for converting the yaw moment into the steering angle and is a coefficient obtained and set in advance by experiments or the like.

As the technique of generating a yaw rate, by calculating a steering force (steering torque) by STRtrg=Kb×Ms and using a steering angle controller such as an electric power steering and applying the calculated steering force to the steering operation, the steering angle of the steering operation may be controlled to vary to the opposite side of the side on which the obstacle SM is present. The coefficient Kb is a coefficient for converting the yaw moment into the steering torque and is a coefficient obtained and set in advance by experiments or the like.

(Operations Etc.)

In this embodiment, as illustrated in FIG. 6, a process of detecting whether or not the obstacle SM is present in the obstacle detection area K-AREA set rearward and sideward of the vehicle MM is performed. The curvature β (lane shape) of the travel lane in the preset forward area F-AREA set ahead of the vehicle MM is obtained as the road shape information. The deviation angle δdriverhosei which is a difference (increase) between the predicted steering angle δpath calculated from the curvature β of the travel lane and the actual steering angle δ is calculated. When the deviation angle δdriverhosei is larger than the preset deviation angle δth1 and the steering is a steering operation toward the obstacle SM, it is determined that the driver has an intention of lane change toward the obstacle SM and a warning sound is generated to give the driver a warning. When the deviation angle δdriverhosei is larger than the preset deviation angle δth, it is determined that the driver has an intention of lane change toward the obstacle SM and a yaw moment for preventing the approach to the obstacle is generated. Accordingly, it is possible to support preventing the vehicle MM from approaching to the obstacle SM.

Here, in this embodiment, the detection accuracy S of the curvature β of the travel lane ahead of the vehicle MM is calculated and the preset deviation angle δth is changed so that the lower the detection accuracy S becomes, the larger the preset deviation angle δth becomes. As a result, as the detection accuracy S of the curvature β becomes lower, the start of the obstacle approach prevention control is more suppressed, that is, it is more difficult to determine that the control should starts.

In this way, in this embodiment, when the detection accuracy S of the road shape is low, the determination of the start of the control is suppressed. Accordingly, when the detection accuracy S of the road shape is low, it is possible to avoid performing of unnecessary approach prevention control. As a result, it is possible to reduce an uncomfortable feeling due to the driver's unnecessary approach prevention control.

When a road on which a vehicle is traveling is a straight road, the decreasing of detection accuracy of an intention of lane change based on the road shape is small. Accordingly, when the distance-to-curve which is a distance from the current position of the vehicle to a curve is equal to or more than a preset distance-to-curve, the suppression of the start of the control is inhibited.

At this time, when the detection accuracy Sx of the distance-to-curve is low, the start of the obstacle approach prevention control is more suppressed, that is, it is more difficult to determine that the control should start, by setting the preset distance-to-curve to be larger.

(Modifications to the Embodiments)

(1) In the above-mentioned embodiment, an example where the lower the detection accuracy S of the curvature β becomes, the larger the preset deviation angle δth is changed to become. Instead of this or together with this, a configuration in which the lower the detection accuracy S of the curvature β becomes, the larger the preset deviation angle δth1 for the warning is changed to become may be employed. In this case, the lower the detection accuracy S of the curvature β becomes, the more the process of issuing a warning is suppressed.

(2) When the road shape information (curve information) of the road ahead of the vehicle MM is detected with the front camera 13, the process of step S100 can be carried out as follows.

That is, the image of the preset forward area F-AREA set ahead in the traveling direction of the vehicle MM is captured with the front camera 13 and white line edges of a lane are obtained by processing the captured image. As the method of obtaining the white line edges, the above-mentioned known method can be employed. On the basis of the number of detected points (which may be the number of points within a predetermined distance) of the white line edges obtained from the preset forward area F-AREA, it is determined that the detection accuracy S of the road shape is low when the number of detected points is smaller than a predetermined reference number. Alternatively, an approximate curve connecting the edge points is drawn and it is determined that the larger the degree of variance of distances from the approximate curve to the edge points is, the lower the detection accuracy S of the road shape is.

For example, when the forward road shape is detected with the front camera 13, the detection accuracy S of the road shape may be calculated on the basis of the number of detected white line edge points and the reliability of detection of the white line edge points. Specifically, for example, when the brightness of an edge point is equal to or more than a predetermined brightness value, the reliability of detection of the edge point is set to 100%. The lower brightness an edge point has, the lower reliability of detection of the edge point is set to. Then, the detection accuracy S of the road shape is calculated by multiplying the average value of the reliability of detection of all the edge points by the number of detected edge points. In this case, for example, as described above, in an area from which 10 edge points are normally detected, the detection accuracy is calculated as S1 when the average value of the reliability of detection is 100% and the number of edge points is 10, and the detection accuracy is calculated as S0.5 when the average value of the reliability of detection is 50% and the number of edge points is 10.

The above-mentioned method can be used as the method of detecting the detection accuracy S.

(3) When the road shape information (curve information) of the road ahead of the vehicle MM is obtained by road-vehicle communication with an infrastructure or inter-vehicle communication with another vehicle or the like, the process of step S100 can be performed as follows.

That is, when node information of a lane ahead in the traveling direction is obtained by the road-vehicle communication or the inter-vehicle communication, the detection accuracy S is determined on the basis of the nodes as in Modification (2).

When the road curvature β transmitted from an infrastructure or another vehicle is received to obtain the curvature β by the road-vehicle communication or the inter-vehicle communication, it is determined that the closer the curvature β is to a single curvature β, the lower the accuracy S is. That is, in an actual road situation, even a single curve is formed of curves with plural curvatures β and a curved road formed of a curve with a single curvature β is rare. Therefore, it can be estimated that as the curvature β is closer to a single curvature β, the accuracy S is lower.

(4) In the process of step S110, the following process is performed instead of the above-mentioned process or together therewith, and the start of the control may be suppressed (it may be made to be difficult to determine the control should start).

In this modification, the detection range of the obstacle SM is adjusted to suppress the start of the obstacle approach prevention control.

Specifically, on the basis of the detection accuracy S of the curvature β (lane shape) detected in step S30, the lower the detection accuracy S is, the narrower the distance range in the longitudinal direction of the obstacle detection area K-AREA is set to be, presence of the obstacle SM being detected from the obstacle detection area K-AREA. For example, the detection range is set from a lateral side of the vehicle MM to 7 m behind the vehicle MM when the detection accuracy S is high, the detection range is set from a lateral side of the vehicle MM to 3 m behind the vehicle MM when the detection accuracy S is low, and the detection range therebetween is linearly adjusted depending on the detection accuracy S.

Alternatively, on the basis of the detection accuracy S of the curvature β (lane shape) detected in step S30, the lower the detection accuracy S is, the narrower the distance range in the transverse direction of the obstacle detection area K-AREA is set to be, presence of the obstacle SM being detected from the obstacle detection area K-AREA. For example, the detection range is set up to 3 m from the vehicle MM in the lateral direction when the detection accuracy S is high, the detection range is set up to 1.5 m from the vehicle MM in the lateral direction when the detection accuracy S is low, and the detection range therebetween is linearly adjusted depending on the detection accuracy S.

(5) The smaller the distance between the vehicle MM and the white line becomes, the smaller the degree of narrowing of the obstacle detection area K-AREA may be set to be, whereby the degree of suppression of the start of the obstacle approach prevention control may be reduced as the distance between the vehicle MM and the white line becomes smaller.

Here, step S30 corresponds to the road shape detecting unit. The steering angle sensor 19 corresponds to the steering amount detecting unit. The imaging unit 26 and step S20 correspond to the obstacle detecting unit. Step S50 corresponds to the driver intention determining unit. Step S120 corresponds to the control start determining unit. Steps S130 to S150 correspond to the obstacle approach prevention control unit. Step S100 corresponds to the detection accuracy determining unit and the edge point extracting unit. Steps S70 to S90 and S110 correspond to the start determination suppressing unit. Step S40 corresponds to the predicted steering angle calculating unit. The front camera 13 corresponds to the front imaging unit. Step S70 corresponds to the distance-to-curve detecting unit and the vehicle positioning unit. Step S80 corresponds to the positioning accuracy detecting unit and the distance-to-curve detecting unit.

(Effects of this Embodiment)

This embodiment exhibits the following effects.

(1) The braking/driving force control unit 8 detects the road shape in the preset forward area F-AREA which is a predetermined range set ahead of the vehicle MM. The braking/driving force control unit 8 sets at least the area rearward and sideward of the vehicle MM as the obstacle detection area K-AREA and detects the obstacle SM present in the obstacle detection area K-AREA. The braking/driving force control unit 8 determines a driver's intention of lane change on the basis of the detected road shape (road curvature β) and the detected steering angle (steering amount). The braking/driving force control unit 8 determines that the approach prevention control for supporting of preventing the vehicle MM from approaching to the obstacle SM should start, when it is determined that the driver has an intention of lane change and the obstacle SM is detected. When it is determined that the control should start, the braking/driving force control unit 8 performs the approach prevention control. The braking/driving force control unit 8 detects the detection accuracy S of the road shape. The braking/driving force control unit 8 suppresses the determination on whether the approach prevention control should start, when the detected detection accuracy S is lower than a preset accuracy threshold.

According to this configuration, when the detection accuracy S of the road shape is low, the start of the approach prevention control is suppressed. Accordingly, when the detection accuracy S of the road shape is low, it is possible to reduce performing of unnecessary approach prevention control (intervention by unnecessary approach prevention control). Accordingly, when performing driving support for the obstacle SM rearward and sideward of the vehicle MM, it is possible to suppress an uncomfortable feeling given to a driver.

(2) The braking/driving force control unit 8 calculates the predicted steering angle which is a steering angle necessary for traveling along the detected road shape. The braking/driving force control unit 8 determines that the driver has an intention of lane change when the deviation angle between the detected actual steering angle and the predicted steering angle is equal to or more than a preset deviation angle.

According to this configuration, the steering angle is employed as the steering amount. Accordingly, it is possible to determine whether the driver has an intention of lane change, for example, on the basis of the steering amount larger than the steering angle necessary for traveling along a curved road.

(3) The braking/driving force control unit 8 suppresses the determination on whether the approach prevention control should start by changing the preset deviation angle to a larger value.

According to this configuration, it is possible to realize suppression of the determination on whether the approach prevention control should start by increasing the threshold value for the determination on whether the driver has an intention of lane change.

(4) The braking/driving force control unit 8 suppresses the determination on whether the approach prevention control should start by narrowing the range of the obstacle detection area K-AREA.

According to this configuration, it is possible to realize suppression of the determination on whether the approach prevention control should start by narrowing the range of the obstacle detection area K-AREA.

(5) The braking/driving force control unit 8 detects the road shape in the preset forward area F-AREA on the basis of plural nodes present at map positions corresponding to the preset forward area F-AREA set ahead of the vehicle MM in the map information stored in the navigation apparatus 31. The braking/driving force control unit 8 detects the detection accuracy S of the road shape so that the larger the spaces between the plural nodes are, the lower the detection accuracy is.

According to this configuration, the detection accuracy S is set on the basis of the spaces between the nodes (point sequence) defining a curve shape. Accordingly, it is possible to detect the detection accuracy S in conjunction with the detection accuracy S on how the variation of the curve transitions.

(6) The braking/driving force control unit 8 detects the road shape in the preset forward area F-AREA on the basis of plural nodes present at map positions corresponding to the preset forward area F-AREA set ahead of the vehicle MM in the map information stored in the navigation apparatus 31. The braking/driving force control unit 8 calculates an approximate curve of the plural nodes and detects the detection accuracy S of the road shape so that the larger the variance of the distances from the approximate curve to the plural nodes is, the lower the detection accuracy is.

According to this configuration, the detection accuracy S is set on the basis of the variance of the nodes defining the curve shape. Accordingly, it is possible to detect the detection accuracy S in conjunction with the detection accuracy S on how the variation of the curve transitions.

(7) The braking/driving force control unit 8 processes the image captured with the front camera 13 and extracts plural edge points for specifying a lane dividing line present in the preset forward area F-AREA. The braking/driving force control unit 8 detects the road shape in the preset forward area F-AREA ahead of the vehicle MM on the basis of the extracted plural edge points. The braking/driving force control unit 8 detects the detection accuracy S of the road shape so that the smaller the number of detected edge points is, the lower the value of the detection accuracy is.

According to this configuration, the road shape in the preset forward area F-AREA ahead of the vehicle MM is detected on the basis of the extracted plural edge points. When the imaging accuracy is low, the number of edge points decreases. As a result, it is possible to detect the detection accuracy S of the road shape.

(8) The braking/driving force control unit 8 processes the image captured with the front camera 13 and extracts plural edge points for specifying a lane dividing line present in the preset forward area F-AREA. The braking/driving force control unit 8 detects the road shape in the preset forward area F-AREA ahead of the vehicle MM on the basis of the extracted plural edge points. The braking/driving force control unit 8 calculates an approximate curve of the plural edge points and detects the detection accuracy S of the road shape so that the larger the variance of distances between the approximate curve and the plural edge points is, the lower the value of the detection accuracy is.

According to this configuration, the detection accuracy S is set on the basis of the variance of the edge points defining the curve shape. Accordingly, it is possible to detect the detection accuracy S in conjunction with the detection accuracy S on how the variation of the curve transitions.

(9) The braking/driving force control unit 8 detects a distance-to-curve which is a distance from the current position of the vehicle MM to the start position of a curved road ahead in the traveling direction of the vehicle MM. The braking/driving force control unit 8 suppresses the determination on whether the approach prevention control should start only when the detected distance-to-curve is equal to or less than a preset distance-to-curve.

The road shape of a curved road causes a problem in determining an intention of lane change. In consideration thereof, by suppressing the determination on whether the approach prevention control should start only when the distance-to-curve is equal to or less than the preset distance-to-curve, it is possible to reduce the suppression of the determination on whether the unnecessary approach prevention control should start.

(10) The braking/driving force control unit 8 detects the detection accuracy of the position of the vehicle MM. The braking/driving force control unit 8 detects the distance-to-curve on the basis of the detected position of the vehicle MM.

The braking/driving force control unit 8 sets the preset distance-to-curve to be larger as the detected detection accuracy becomes lower.

According to this configuration, when the detection accuracy of the distance-to-curve is low, the preset distance-to-curve is set to be lager to suppress the determination on whether the approach prevention control should start. As a result, it is possible to reduce performing of the unnecessary approach prevention control.

(11) The braking/driving force control unit 8 detects the curvature β of the road as the road shape.

Accordingly, it is possible to detect the road shape.

(12) The approach prevention control is at least one of control of notification to a driver and control for giving a yaw moment in the opposite direction of the lane change direction of the vehicle MM.

Accordingly, it is possible to support approach prevention.

Second Embodiment

A second embodiment will be described below with reference to the accompanying drawings. The same elements as in the above-mentioned embodiment will be referenced by the same reference numerals.

The basic configuration of this embodiment is the same as the first embodiment. In the second embodiment, a steering speed instead of the steering angle is used as the steering amount.

Processes different from those of the first embodiment will be described below.

Figure 7:
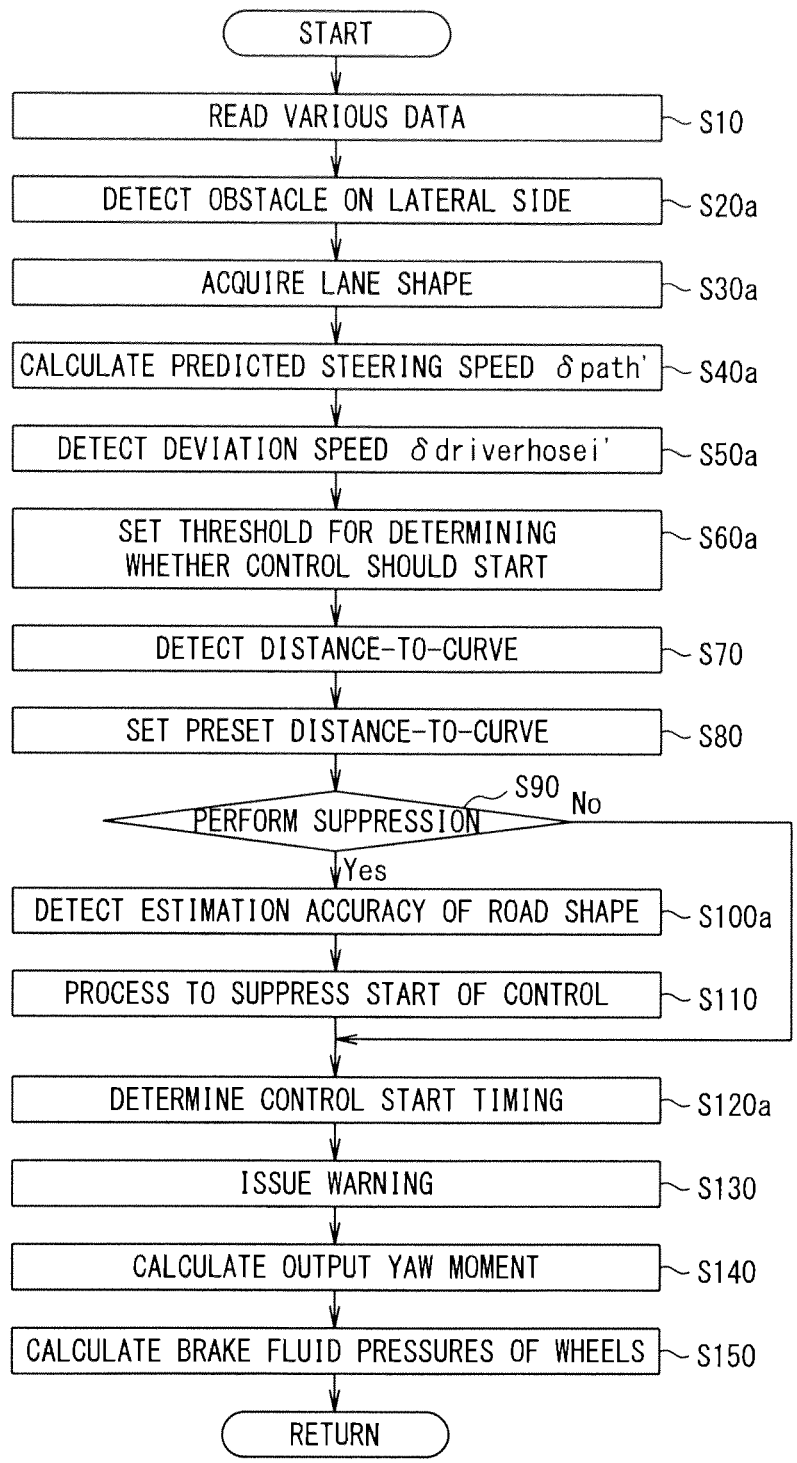
FIG. 7 is a flowchart illustrating an example of a processing procedure in a control unit in a second embodiment.

In this embodiment, the processing procedure illustrated in FIG. 7 is performed instead of the processing procedure (FIG. 5) described in the first embodiment. The differences will be described below.

In the process of step S20*a* (process of detecting the obstacle SM), the obstacle SM is detected using the rear camera in the first embodiment. On the contrary, in the second embodiment, the configuration illustrated in FIG. 4 is employed and the obstacle SM is detected using millimeter wave radars (24L and 24R).

In the process of step S30*a*, the curvature β of the travel chain line is obtained by processing the image captured with the front camera 13 in the second embodiment.

In step S40*a*, a predicted steering speed δpath' is calculated using the curvature β of the travel lane obtained as the forward curve information. The predicted steering angle δpath' is a steering speed necessary for causing the vehicle MM to maintain the traveling path, that is, a steering speed necessary for causing the vehicle MM to travel along the travel lane. The predicted steering speed δpath' can be calculated by differentiating the predicted steering angle δpath.

In step S50*a*, a deviation speed δdriverhosei' is detected. Here, the symbol "'" represents a first differential.

The deviation speed δdriverhosei' is calculated using the following expression.

$$\delta driverhosei' = \delta' - \delta path' \quad (14)$$

In step S60*a*, a preset deviation speed δthx used to determine whether approach prevention control for preventing of the approach to the obstacle SM should start.

The preset deviation speed δthx is a value which becomes smaller as the vehicle velocity becomes higher. The preset deviation speed δthx is set, for example, as a map corresponding to the vehicle velocity.

The preset deviation speed δthx may be set as a map so that the closer the vehicle MM is to a white line, the smaller the value thereof is. Alternatively, the preset deviation speed δthx may be set as a map so that the closer the vehicle MM is to the obstacle SM, the smaller the value thereof is.

In step S100*a*, for example, the preset deviation speed δthx used to determine whether lane change is performed is changed.

The change of the preset deviation speed δthx can be performed by the same process as described in step S100 in the first embodiment.

Then, in step S120*a*, it is determined whether the control should start. Specifically, it is determined whether the deviation speed δdriverhosei' calculated in step S50*a* is larger than the preset deviation speed δthx. When it is determined that δdriverhosei' is larger than the preset deviation speed δthx, the obstacle approach prevention control is set to ON. On the other hand, when δdriverhosei' is equal to or less than the preset deviation speed δthx, the obstacle approach prevention control determination flag is set to OFF. Here, when the steering direction is different from the obstacle detection direction, the change of the obstacle approach prevention control determination flag from OFF to ON is inhibited.

Hysteresis of F may be given such as

"δdriverhose*i*'<δ*thx*–F".

The other configuration is the same as in the first embodiment.

(Operation Etc.)

In this embodiment, a process of detecting whether the obstacle SM is present in the obstacle detection area K-AREA set rearward and sideward of the vehicle MM is performed. The curvature β (lane shape) of the travel lane in the preset forward area F-AREA set ahead of the vehicle MM is obtained as the road shape information. Furthermore, the deviation speed δdriverhosei' which is a deviation between the predicted steering speed δpath' calculated from the curvature β of the travel lane and the actual steering speed δ' is calculated. When the deviation speed δdriverhosei' is larger than the preset deviation speed δthx and the steering is a steering operation toward the obstacle SM, it is determined that a driver has an intention of lane change toward the obstacle SM and a warning sound is generated to give the driver a warning. When the deviation speed δdriverhosei' is larger than the preset deviation speed δthx, it is determined that the driver has an intention of lane change toward the obstacle SM and a yaw moment for preventing the approach to the obstacle SM is generated. Accordingly, it is possible to support preventing the vehicle MM from approaching to the obstacle SM.

Here, in this embodiment, the detection accuracy S of the curvature β of the travel lane ahead of the vehicle MM is calculated and the preset deviation speed δht' is changed so that the lower the detection accuracy S becomes, the larger the preset deviation speed δthx becomes. As a result, as the detection accuracy S of the curvature β becomes lower, the start of the obstacle approach prevention control is more suppressed, that is, it is more difficult to determine that the control should start.

In this way, in this embodiment, when the detection accuracy S of the road shape is low, the determination of the start of the control is suppressed. Accordingly, when the detection accuracy S of the road shape is low, it is possible to avoid performing of unnecessary approach prevention control. As a result, it is possible to reduce an uncomfortable feeling of a driver due to the unnecessary approach prevention control.

Here, step S50*a* corresponds to the predicted steering speed calculating unit. Step S120*a* corresponds to the driver intention determining unit. Step S110 corresponds to the start determination suppressing unit.

(Effects of this Embodiment)

This embodiment exhibits the following effects in addition to the effects described in the first embodiment.

(1) The braking/driving force control unit 8 calculates the predicted steering speed which is a steering speed necessary for causing the vehicle to travel along the detected road shape. The braking/driving force control unit 8 determines that the driver has an intention of lane change when the deviation speed between the detected actual steering speed and the calculated predicted steering speed is equal to or more than a preset deviation speed.

According to this configuration, the steering deviation for determining of the estimation of the driver's intention is detected as the steering angular velocity. Accordingly, when steering is performed over the steering angular velocity necessary for traveling along a curve, it is possible to determine that the steering is not steering for maintaining the lane. That is, it is possible to detect the driver's intention of lane change.

(2) The braking/driving force control unit 8 suppresses the determination on whether the approach prevention control should start by changing the preset deviation speed to a larger value.

According to this configuration, it is possible to suppress the determination on whether the approach prevention control should start by setting the threshold value for determining the driver's intention of lane change to a larger value.

Third Embodiment

A third embodiment will be described below with reference to the accompanying drawings. The same elements as in the above-mentioned embodiment will be referenced by the same reference numerals.

The basic configuration of this embodiment is the same as the first embodiment.

In the third embodiment, it is determined whether or not the control should start on the basis of a future transverse position predicted based on the steering instead of using the actual steering amount. Specifically, the control is performed on the basis of a transverse position variation of the vehicle MM after a predetermined time Ts.

Figure 8:
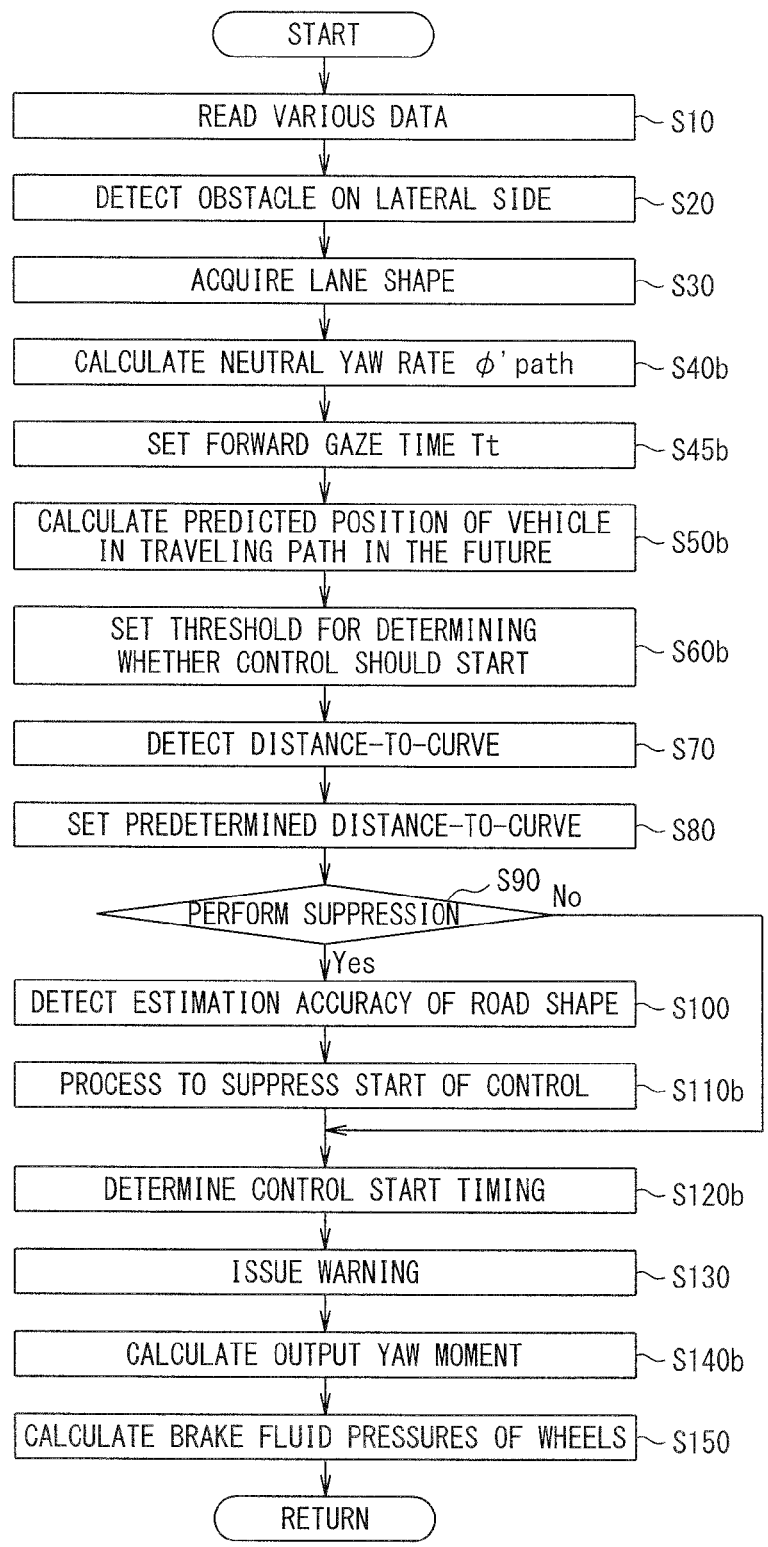
FIG. 8 is a flowchart illustrating an example of a processing procedure in a control unit in a third embodiment.

Steps S40*b* to S120*b* and S140*b* are performed as illustrated in FIG. 8 instead of steps S40 to S120 and S140 described in the first embodiment.

The processes of the different steps will be described below.

In step S40*b*, a neutral yaw rate $\phi'$ path for maintaining a traveling path is calculated using the traveling curvature $\beta$. The neutral yaw rate $\phi'$ path is calculated, for example, using the following expression.

$$\phi'\text{path} = \beta \times V \tag{15}$$

The average $\phi'$ave of the yaw rates $\phi'$ for a predetermined time or a value obtained by filtering the yaw rate $\phi'$ with a filter having a large time constant may be simply used as the neutral yaw rate $\phi'$path for maintaining the traveling path.

In step S45*b*, a forward gaze time Tt is set. The forward gaze time Tt is an index for determining a threshold value used to predict a contact condition of a driver with the obstacle SM in the future.

In step S50*b*, a predicted transverse position $\Delta Xb$ of the vehicle in the transverse direction relative to the current position in the travel lane is calculated to determine that the driver changes the lane with departing from the travel lane.

The predicted transverse position $\Delta Xb$ of the vehicle in the future is calculated using the following expression.

$$\Delta Xb = (K1\phi + K2\phi m + K3 m') \tag{16}$$

Here, the following definitions are used.

L: forward gaze point distance=forward gaze time Tt×V
$\phi$: yaw angle
$\phi$m: target yaw angular velocity (target yaw rate+$\Psi$driverhosei×forward gaze time T)
$\phi$m': target yaw angular acceleration (target yaw angular velocity $\phi$m'×forward gaze time $T^2$)

This expression can be expressed by the following expression using the forward gaze time T so as to convert the terms into the dimension of the yaw angle.

$$\Delta Xb = L(K1\phi + K2\phi m \times T + K3\phi m' \times T^2) \tag{17}$$

On the basis of this characteristic, K1 is a preset gain based on a function of the vehicle velocity, K2 is a preset gain based on a function of the vehicle velocity and the forward gaze time, and K3 is a preset gain based on a function of the vehicle velocity and the square of the forward gaze time.

$\Delta Xb$ calculated herein is used to determine whether the approach prevention control for preventing of the approach to the obstacle SM should start in the subsequent stage.

Here, $\Delta Xb$ is calculated using the following expression in which the target yaw rate $\Psi$driverhosei is obtained by subtracting the yaw rate $\phi'$path necessary for traveling the path calculated in step S40*b* from the so-called target yaw rate $\Psi$driver calculated from the steering angle and the vehicle velocity so as to discriminate the influence on the steering for traveling a curved road.

$$\Psi\text{driverhose}i = \Psi\text{driver} - \phi'\text{path} \tag{18}$$

In step S60*b*, a preset transverse position is set which is a threshold value for determination on whether the approach prevention control for prevention of the approach to the obstacle SM should start.

Figure 9:
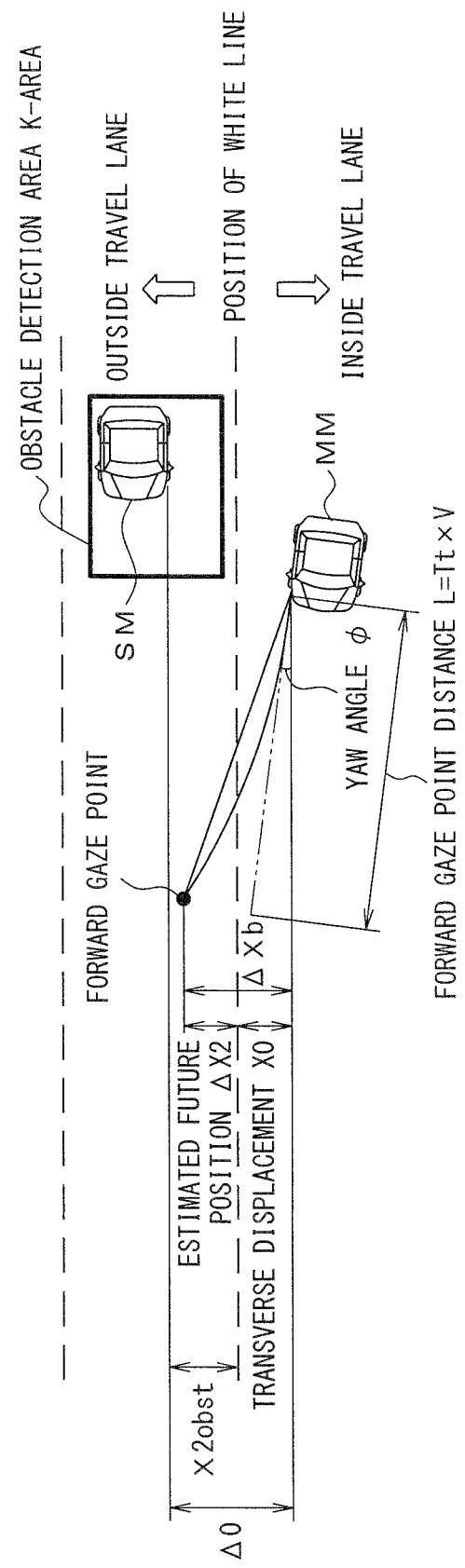
FIG. 9 is a conceptual diagram illustrating a relationship between a vehicle and an obstacle.

As the preset transverse position of the obstacle SM, the transverse position of the obstacle SM on the X axis coordinate which is perpendicular to the travel lane is detected when the travel lane is defined as the Y axis. The distance between the vehicle MM and the obstacle SM indicated by $\Delta O$ in FIG. 9 is calculated and set as the preset transverse position.

Here, when the distance to the obstacle SM varies due to detection using a radar and it is thus difficult to detect the obstacle, the preset transverse position may be set as if the obstacle SM is virtually present at a preset transverse position outside the white line, for example, based on whether the obstacle SM is detected from the predetermined obstacle detection area K-AREA set on the lateral side of the vehicle MM. In this case, it is assumed that the obstacle SM is present, for example, at a predetermined position outside the white line.

The detection area for detecting the obstacle SM is set at a predetermined longitudinal and transverse position on the lateral side of the vehicle MM.

In step S110*b*, on the basis of the detection accuracy S of the road shape (curve) detected in step S100, the preset transverse position $\Delta O$ (in case of determination using Condition 1) is reset, such that the preset transverse position $\Delta O$ becomes lager as the detection accuracy S becomes lower, so as to make it difficult to perform the determination.

Specifically, for example, the preset transverse position $\Delta O$ corresponding to the detection accuracy S of the curvature $\beta$ is stored in advance in a map or the like and the preset transverse position $\Delta O$ is reset by retrieving it from the map depending on the detected detection accuracy S of the curvature $\beta$. Alternatively, a correction coefficient (>1) may be set which becomes larger as the detection accuracy S of the curvature $\beta$ becomes lower, the set correction coefficient is multiplied by the preset transverse position $\Delta O$, and the preset transverse position ΔO may be corrected such that the preset transverse position ΔO becomes lager as the detection accuracy S of the curvature β becomes lower.

Here, when Condition 2 or Condition 3 to be described later is employed, XO or Xthresh is set to a predetermined initial value as the preset transverse position.

In step S120b, as illustrated in FIG. 9, the transverse position of the vehicle MM after a predetermined elapse time passes is estimated, and it is determined that the driver performs a lane changing operation so as to approach to the obstacle SM when the predicted transverse position ΔXb which is a deviation between the transverse position after the estimated predetermined elapse time passes and the current transverse position is equal to or more than the distance AG in the transverse direction between the vehicle MM and the detected obstacle SM (Condition 1).

Here, ΔO is set to a value obtained by dividing the actual distance to the obstacle SM by a margin. The correction of a position to be described later is performed on the margin.

When the distance ΔO between the vehicle MM and the obstacle SM is not detected or cannot be detected, the preset transverse position X2obst may be set to a predetermined position from a white line as a reference instead and the determination may be performed depending on whether the estimated future position ΔX2 from the white line reaches the predetermined position (Condition 2).

The threshold value which is set at a predetermined position from the white line may be set to be inside the white line. Alternatively, the determination may be performed when the future position is predicted to move by a predetermined specific distance Xthresh from the vehicle position (Condition 3). The transverse position relationship with the obstacle SM or the white line may be detected instead of the predicted transverse position ΔXb. The above-mentioned conditions can be described by the following expressions.

$$\Delta Xb >= \Delta O \quad \text{Condition 1}$$

$$\Delta Xb >= X2\text{obst} + XO \quad \text{Condition 2}$$

$$\Delta Xb >= X\text{thresh} \quad \text{Condition 3}$$

Here, the predicted transverse position ΔXb is calculated as ΔXbL/ΔXbR for the left edge and the right edge of the vehicle and is used for the determination.

A vehicle behind the vehicle MM can be set as a target obstacle SM and an oncoming vehicle ahead in a neighboring lane may be set as a control target.

In step S140b, an output yaw moment Ms is set.

The output yaw moment Ms is calculated by the following expression.

$$Ms\_str = K1\text{recv} \times K2\text{recv} \times \Delta Xs$$

$$\Delta Xs = (K0\text{mom} \times \text{transverse position} + K1\text{mom}\phi + K2\text{mom}\phi m)$$

Alternatively, any one of ΔXs=ΔO−ΔXb, X2obst+XO−ΔXb, and Xthresh−ΔXb may be used. (deviation from a reference threshold value at the predicted transverse position)

Here, K1recv is a proportional gain determined depending on the vehicle dimensions and K2recv is a gain varying depending on the vehicle velocity V.

The gain K2 has, for example, a large value in a low velocity zone, has an inverse proportional relation with respect to the vehicle velocity V when the vehicle velocity V reaches a certain value, and has a small constant value when the vehicle velocity reaches a certain velocity V.

The other configuration is the same as in the first embodiment.

(Operations Etc.)

In this embodiment, the predicted transverse position which is a transverse position of the vehicle MM in the lane width direction and at which it is estimated that the vehicle is located after a predetermined time on the basis of the detected road shape. When the estimated predicted transverse position ΔXb is located outside the preset transverse position which is a preset position in the lane width direction, it is determined that the driver has an intention of lane change. When the obstacle SM is detected in the lane change direction, the approach prevention control is started.

At this time, the determination on whether the approach prevention control should start is suppressed by changing the preset transverse position in the lane width direction to an outer position in the lane width direction as the detection accuracy S of the road shape becomes lower.

As a result, in this embodiment, when the detection accuracy S of the road shape is low, the determination of the start of the control is suppressed. Accordingly, when the detection accuracy S of the road shape is low, it is possible to avoid performing of unnecessary approach prevention control. As a result, it is possible to reduce an uncomfortable feeling of a driver due to unnecessary approach prevention control.

Here, step S50b corresponds to the steering amount detecting unit. Step S120b corresponds to the driver intention determining unit. Step S110b corresponds to the start determination suppressing unit. Step S60b *corresponds to the obstacle position detecting unit.*

(Effects of this Embodiment)

This embodiment exhibits the following effects in addition to the effects described in the first embodiment.

(1) The braking/driving force control unit 8 estimates the predicted transverse position which is a transverse position of the vehicle MM in the lane width direction and at which it is estimated that the vehicle is located after a predetermined time on the basis of the road shape detected by the road shape detecting unit. The braking/driving force control unit 8 determines that the driver has an intention of lane change when the estimated predicted transverse position is outside the preset transverse position which is a preset position in the lane width direction.

According to this configuration, the steering amount for determining the driver's intention is calculated by a variation of the future transverse position. Accordingly, the determination is performed using the steering amount obtained by considering the steering angle and the steering speed comprehensively. Accordingly, it is possible to determine that the driver has an intention of lane change when steering is performed over the steering angle and speed necessary for traveling along a curved road.

(2) The braking/driving force control unit 8 suppresses the determination on whether the approach prevention control should start by changing the preset transverse position in the lane width direction to an outer position in the lane width direction.

According to this configuration, it is possible to realize the suppression of the determination on whether the approach prevention control should start.

(3) The braking/driving force control unit 8 detects the position of the obstacle SM detected by the obstacle detecting unit relative to the vehicle MM in the lane width direction. The preset transverse position is to the position ΔO of the obstacle SM detected by the obstacle position detecting unit relative to the vehicle MM in the lane width direction.

According to this configuration, it is possible to realize the suppression of the determination on whether the approach prevention control should start.

(4) The preset transverse position is set to a position Xthresh which is spaced apart by a predetermined distance in the lane width direction from the current transverse position of the vehicle MM in the lane width direction.

According to this configuration, it is possible to realize the suppression of the determination on whether the approach prevention control should start.

(5) The preset transverse position is set to a position $\Delta X2obst$ which is spaced apart by a predetermined distance in the lane width direction from a lane edge.

According to this configuration, it is possible to realize the suppression of the determination on whether the approach prevention control should start.

Priority is claimed on Japanese Patent Application No. 2011-189504 (filed on Aug. 31, 2011), the entire content of which is incorporated by reference as a part of this application.

While the present invention has been described with reference to the definite number of embodiments, the scope of the present invention is not limited thereto and improvements and modifications of the embodiments based on the above disclosure are obvious to those skilled in the art.

REFERENCE SIGNS LIST

8: braking/driving force control unit
19: steering angle sensor
21: steering wheel
24L/24R: millimeter wave radars
26: imaging unit
30: fluid pressure circuit
31: navigation apparatus
13: front camera

The invention claimed is:

1. A vehicle driving support apparatus comprising:
a road shape detecting unit for detecting a road shape in a preset forward area which is a predetermined area set ahead of a vehicle;
a steering amount detecting unit for detecting a steering amount depending on an operation amount of a steering wheel steered by a driver;
an obstacle detecting unit for detecting an obstacle present in an obstacle detection area including at least a area rearward and sideward of the vehicle;
a driver intention determining unit for determining whether the driver has an intention of lane change on the basis of the road shape detected by the road shape detecting unit and the steering amount detected by the steering amount detecting unit;
a control start determining unit for determining that approach prevention control for supporting prevention of the vehicle from approaching to the obstacle should start, when it is determined that the driver has the intention of lane change by the driver intention determining unit and the obstacle is detected by the obstacle detecting unit;
an obstacle approach prevention control unit for performing the approach prevention control when the control start determining unit determines that the control should start;
a detection accuracy determining unit for determining detection accuracy of the road shape by the road shape detecting unit;
a start determination suppressing unit for suppressing the determination of the control start determining unit on whether the approach prevention control should start, when the detection accuracy determined by the detection accuracy determining unit is lower than a predetermined accuracy threshold; and
a predicted steering angle calculating unit for calculating a predicted steering angle which is a steering angle necessary for traveling along the road shape detected by the road shape detecting unit,
wherein the steering amount detecting unit detects an actual steering angle which is a steering angle of the steering wheel as the steering amount, and
wherein the driver intention determining unit determines that the driver has the intention of lane change when a deviation angle between the actual steering angle detected by the steering amount detecting unit and the predicted steering angle predicted by the predicted steering angle calculating unit is equal to or more than a preset deviation angle.

2. The vehicle driving support apparatus according to claim 1, wherein the start determination suppressing unit suppresses the determination of the control start determining unit on whether the approach prevention control should start by changing the value of the preset deviation angle to a larger value.

3. The vehicle driving support apparatus according to claim 1, further comprising a predicted steering speed calculating unit for calculating a predicted steering speed which is a steering speed necessary for traveling along the road shape detected by the road shape detecting unit,
wherein the steering amount detecting unit detects an actual steering speed which is a steering speed of the steering wheel as the steering amount, and
wherein the driver intention determining unit determines that the driver has the intention of lane change when a deviation speed between the actual steering speed detected by the steering amount detecting unit and the predicted steering speed calculated by the predicted steering speed calculating unit is equal to or more than a preset deviation speed.

4. The vehicle driving support apparatus according to claim 3, wherein the start determination suppressing unit suppresses the determination of the control start determining unit on whether the approach prevention control should start by changing the value of the preset deviation speed to a larger value.

5. The vehicle driving support apparatus according to claim 1, wherein the steering amount detecting unit detects a predicted transverse position which is a transverse position of the vehicle in a lane width direction at which the vehicle is predicted to be located a preset time passes, as the steering amount, on the basis of the operation amount of the steering wheel steered by the driver and the road shape detected by the road shape detecting unit, and
wherein the driver intention determining unit determines that the driver has the intention of lane change when the predicted transverse position detected by the steering amount detecting unit is located outside a preset transverse position in the lane width direction, the preset transverse position being a predetermined position set in the lane width direction.

6. The vehicle driving support apparatus according to claim 5, wherein the start determination suppressing unit suppresses the determination of the control start determining unit on whether the approach prevention control should start by changing the preset transverse position in the lane width direction to an outer position in the lane width direction.

7. The vehicle driving support apparatus according to claim 5, further comprising an obstacle position detecting unit for detecting a position of the obstacle relative to the vehicle in the lane width direction, the obstacle being detected by the obstacle detecting unit, wherein the preset transverse position is set to a position of the obstacle relative to the vehicle in the lane width direction, the obstacle being detected by the obstacle position detecting unit.

8. The vehicle driving support apparatus according to claim 5, wherein the preset transverse position is set to a position spaced apart by a predetermined distance in the lane width direction from a current transverse position which is a current position of the vehicle in the lane width direction.

9. The vehicle driving support apparatus according to claim 5, wherein the preset transverse position is set to a position spaced apart by a predetermined distance in the lane width direction from a lane edge.

10. The vehicle driving support apparatus according to claim 1, wherein the start determination suppressing unit suppresses the determination of the control start determining unit on whether the approach prevention control should start by narrowing the obstacle detection area.

11. The vehicle driving support apparatus according to claim 1, further comprising a navigation apparatus, wherein the road shape detecting unit detects the road shape in the preset forward area on the basis of a plurality of nodes present at map positions corresponding to the preset forward area which is set ahead of the vehicle in map information of the navigation apparatus, and wherein the detection accuracy determining unit determines the detection accuracy of the road shape by the road shape detecting unit to be lower as spaces between the plurality of nodes become larger.

12. The vehicle driving support apparatus according to claim 1, further comprising a navigation apparatus, wherein the road shape detecting unit detects the road shape in the preset forward area on the basis of a plurality of nodes present at map positions corresponding to the preset forward area which is set ahead of the vehicle in map information of the navigation apparatus, and wherein the detection accuracy determining unit calculates an approximate curve of the plurality of nodes and determines the detection accuracy of the road shape by the road shape detecting unit to be lower as the variance of distances of the plurality of nodes to the approximate curve becomes larger.

13. The vehicle driving support apparatus according to claim 1, further comprising:

a front imaging unit for imaging the preset forward area set ahead of the vehicle; and an edge point extracting unit for processing the image captured by the front imaging unit and for extracting a plurality of edge points for specifying a lane dividing line present in the preset forward area, wherein the road shape detecting unit detects the road shape in the preset forward area ahead of the vehicle on the basis of the plurality of edge points extracted by the edge point extracting unit, and wherein the detection accuracy determining unit determines the detection accuracy of the road shape by the road shape detecting unit to be lower as the number of edge points extracted by the edge point extracting unit becomes smaller.

14. The vehicle driving support apparatus according to claim 1, further comprising:

a front imaging unit for imaging the preset forward area set ahead of the vehicle; and an edge point extracting unit for processing the image captured by the front imaging unit and for extracting a plurality of edge points for specifying a lane dividing line present in the preset forward area, wherein the road shape detecting unit detects the road shape in the preset forward area ahead of the vehicle on the basis of the plurality of edge points extracted by the edge point extracting unit, and wherein the detection accuracy determining unit calculates an approximate curve of the plurality of edge points and determines the detection accuracy of the road shape by the road shape detecting unit to be lower as the variance of distances of the plurality of edge points to the approximate curve becomes larger.

15. The vehicle driving support apparatus according to claim 1, further comprising a distance-to-curve detecting unit for detecting a distance-to-curve which is a distance from a current position of the vehicle to a start position of a curved road ahead in a traveling direction of the vehicle, wherein the start determination suppressing unit suppresses the determination of the control start determining unit on whether the approach prevention control should start only when the distance-to-curve detected by the distance-to-curve detecting unit is equal to or less than a preset distance-to-curve.

16. The vehicle driving support apparatus according to claim 15, further comprising:

a vehicle positioning unit for detecting a position of the vehicle; and a positioning accuracy detecting unit for determining detection accuracy of the position of the vehicle by the vehicle positioning unit, wherein the distance-to-curve detecting unit detects the distance-to-curve on the basis of the position of the vehicle detected by the vehicle positioning unit, and wherein the start determination suppressing unit sets the distance-to-curve to be longer as the detection accuracy detected by the positioning accuracy detecting unit becomes lower.

17. The vehicle driving support apparatus according to claim 1, wherein the road shape detecting unit detects a curvature of the road as the road shape.

18. The vehicle driving support apparatus according to claim 1, wherein the approach prevention control is at least one of notification control to the driver and control of giving a yaw moment in an opposite direction of a lane changing direction of the vehicle.

* * * * *